US012464633B2

(12) United States Patent
Dollinger et al.

(10) Patent No.: US 12,464,633 B2
(45) Date of Patent: Nov. 4, 2025

(54) MANUFACTURING METHOD FOR RADIO-FREQUENCY CAVITY RESONATORS AND CORRESPONDING RESONATOR

(71) Applicant: Universität der Bundeswehr München, Neubiberg (DE)

(72) Inventors: Günther Dollinger, Garching (DE); Michael Mayerhofer, Munich (DE)

(73) Assignee: UNIVERSITÄT DER BUNDESWEHR MÜNCHEN, Neubiberg (DE)

( * ) Notice: Subject to any disclaimer, the term of this patent is extended or adjusted under 35 U.S.C. 154(b) by 166 days.

(21) Appl. No.: 18/005,863

(22) PCT Filed: Jul. 9, 2021

(86) PCT No.: PCT/EP2021/069180
§ 371 (c)(1),
(2) Date: Jan. 18, 2023

(87) PCT Pub. No.: WO2022/017833
PCT Pub. Date: Jan. 27, 2022

(65) Prior Publication Data
US 2023/0300969 A1 Sep. 21, 2023

(30) Foreign Application Priority Data
Jul. 23, 2020 (EP) .................................... 20187438

(51) Int. Cl.
*H05H 7/18* (2006.01)
*H05H 9/04* (2006.01)

(52) U.S. Cl.
CPC .............. *H05H 7/18* (2013.01); *H05H 9/042* (2013.01)

(58) Field of Classification Search
CPC ............ H05H 7/18; H05H 9/042; H05H 7/22; H05H 7/20
See application file for complete search history.

(56) References Cited

U.S. PATENT DOCUMENTS

| | | |
|---|---|---|
| 5,523,659 A | 6/1996 | Swenson |
| 7,411,631 B1 | 8/2008 | Joshi et al. |

(Continued)

FOREIGN PATENT DOCUMENTS

| | | | |
|---|---|---|---|
| CN | 103567726 A | 2/2014 | |
| CN | 107396528 A * | 11/2017 | ........... B22F 3/1055 |

(Continued)

OTHER PUBLICATIONS

Clemente Gianluigi: "The Room Temperature CH-DTL And Its Application For The FAIR Proton Injector", Jan. 1, 2007, pp. 37-80, from IDS (Year: 2007).*

(Continued)

*Primary Examiner* — Rebecca Janssen
(74) *Attorney, Agent, or Firm* — Grossman, Tucker, Perreault & Pfleger, PLLC

(57) ABSTRACT

A method of manufacturing a radio frequency cavity resonator, wherein said radio frequency cavity resonator comprises a tubular structure extending along a longitudinal axis, said tubular structure comprising a circumferential wall structure surrounding said longitudinal axis, one or more tubular elements and a first and a second support structure associated with each of said tubular elements, wherein said first and second support structures are provided on opposite sides of each tubular element and extend radially along a diameter of the tubular structure, wherein the method comprises producing the resonator by additive manufacturing in a manufacturing direction that is parallel to said diameter.

17 Claims, 13 Drawing Sheets

(56) References Cited

U.S. PATENT DOCUMENTS

Figure 1:
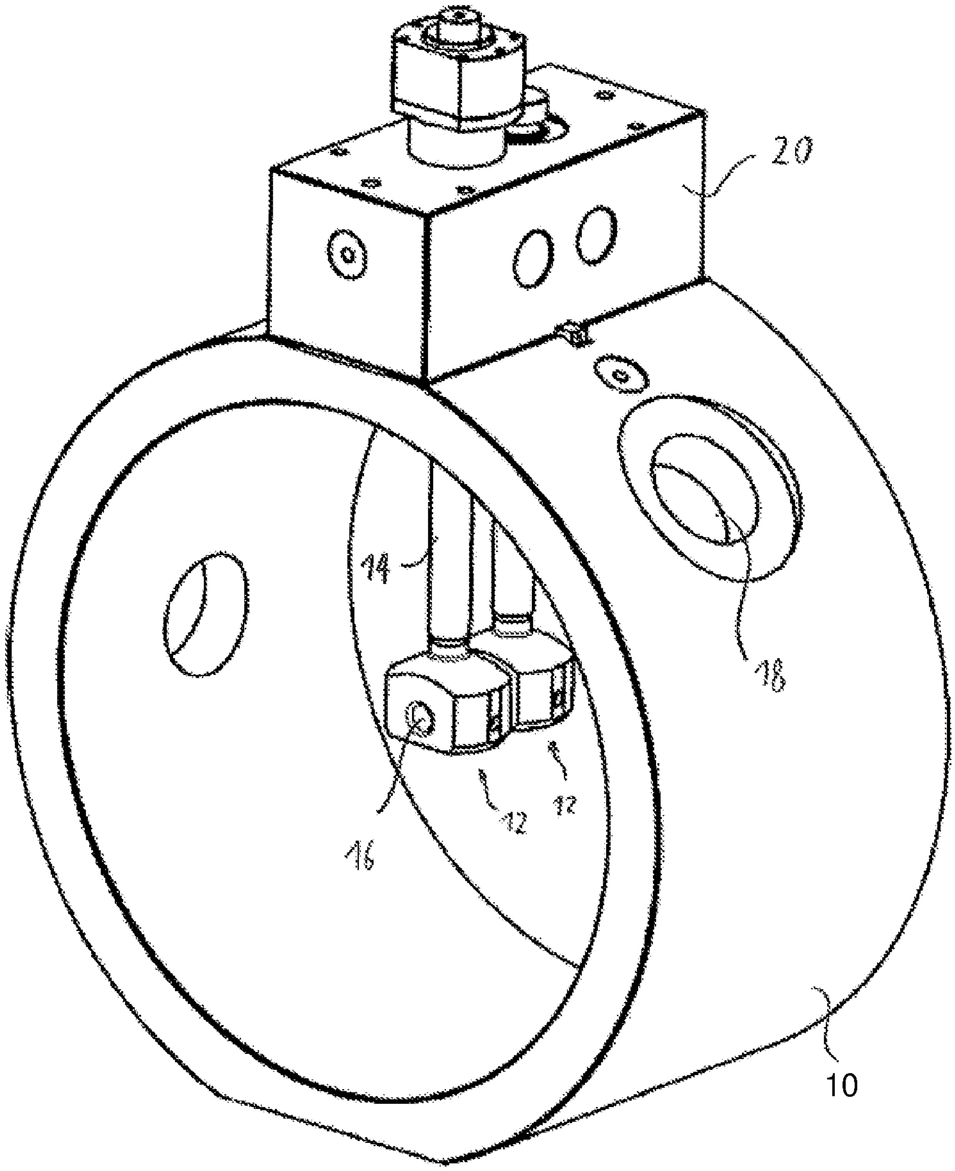

| | | | |
|---|---|---|---|
| 9,023,765 | B1 | 5/2015 | Rimmer et al. |
| 10,098,218 | B2 | 10/2018 | Yamamoto et al. |
| 2008/0129203 | A1 | 6/2008 | Agustsson et al. |
| 2019/0224751 | A1 | 7/2019 | Thangaraj et al. |
| 2020/0113038 | A1 | 4/2020 | Mishin |

FOREIGN PATENT DOCUMENTS

| | | | |
|---|---|---|---|
| CN | 109640508 | A | 4/2019 |
| JP | 2009231232 | A | 10/2009 |
| WO | 2011144222 | | 11/2011 |

OTHER PUBLICATIONS

International Search Report and Written Opinion from PCT Appln. No. PCT/EP2021/069180, dated Oct. 19, 2021.
Creedon Daniel et al: "A 3D printed superconducting aluminium microwave cavity", Applied Physics Letters, AIP Publishing LLC, US, vol. 109, No. 3, Jul. 18, 2016.
P. Frigola et al: "Advance Additive Manufacturing Method For SRF Cavities Of Various Geometries", Proceedings of BRF2015, Whistler, BC, Canada, pp. 1181-1184.
Petronilo Martin-Iglesias et al: "ESA's Recent Developments in the Field of 3D-Printed RF/Microwave Hardware", 2017 11th European Conference on Antennas and Propagation (EUCAP), pp. 553-557.
P. Frigola et al: "Fabricating Copper Components with Electron Beam Melting", Advanced Materials & Processes, Jul. 2014, pp. 20-24.
Terrazas Cesar A. et al: "Fabrication and Characterization Of High-Purity Niobium Using Electron Beam Melting Additive Manufacturing Technology", The International Journal Of Advanced Manufacturing Technology, Springer, London, vol. 84, No. 5, Sep. 10, 2015, pp. 1115-1126.
Stephane Jenzer et al: "Prospects Of Additive Manufacturing For Accelerators", JACoW Publishing, 10th Int. Particle Accelerator Conf., 2019, Melbourne, Australia, pp. 4118-4120.
C A Treml et al: "Resonance Control Cooling System For A Proto-Type Coupled Cavity Linac 1", 8th International Conference on Accelerator & Large Experimental Physics Control Systems, Jan. 1, 2001, pp. 419-421.
Thomas Wangler: "RF Linear Accelerators", John Wiley & Sons Inc, 1998, pp. 102-103.
Yao Z Y et al: "Study of Balloon Spoke Cavities", Proceedings of SRF2013, Feb. 1, 2014, p. 972.
Clemente Gianluigi: "The Room Temperature CH-DTL And Its Application For The FAIR Proton Injector", Jan. 1, 2007, pp. 37-80.

* cited by examiner

MANUFACTURING METHOD FOR RADIO-FREQUENCY CAVITY RESONATORS AND CORRESPONDING RESONATOR

FIELD OF THE INVENTION

The present invention is in the field of particle acceleration devices. More particularly, the present invention relates to a method of manufacturing a radio-frequency cavity resonator, as well as to a corresponding resonator.

BACKGROUND OF THE INVENTION

Radio-frequency (RF) cavity resonators are structures made from highly conductive or superconducting materials into which electromagnetic RF fields are coupled. Within the resonator structure, resonant modes can form which lead to high amplitudes of the electromagnetic field.

A common application of RF cavity resonators is in the field of particle accelerators. Particle accelerators are used in various fields of science and technology, for example natural science, in particular physics, material science, device testing and the like. Moreover, particle accelerators have increasing importance in medical technology, and in particular in radiation therapy. Currently, by far the most part of radiation therapy is carried out with x-ray or electron beams, and in both types of devices, electrons have to be accelerated using a suitable accelerator. In case of electron beam therapy, a beam of high-energy electrons is generated and directly applied to the target tissue, for example a tumor or a tumor bed after a tumor has been excised. In x-ray therapy devices, x-rays are typically generated by first generating an electron beam which is directed to an x-ray target, where the electrons are stopped and x-rays are generated due to bremsstrahlung.

A very promising, newer type of radiation therapy, however, relies on ion beams, in particular proton beams. As compared to electron beams or x-ray radiation, ion beams have the advantage that they allow for applying a desired radiation dose in a more location specific manner, meaning that any side effects in the healthy tissue surrounding a tumor may be prevented or at least greatly reduced. This even allows for treating tumors which are very close to a specific organ at risk which cannot be treated with x-ray or electron radiation due to a lack of location specificity.

In existing ion radiation therapy apparatus, the ion beam is typically accelerated in a ringlike accelerator, such as a synchrotron or a cyclotron, although linear accelerators would be advantageous in several respects. In synchrotrons, ions can be accelerated to the desired energies. However, these facilities are very expensive and large to achieve the required ion energies. Cyclotrons are much cheaper and are mainly used in proton therapy. Using cyclotrons, protons are accelerated usually to a defined energy somewhere between 230 MeV and 250 MeV. The protons are slowed down in a degrader of adjustable material thickness behind the cyclotron to achieve lower beam energies as required to treat a tumor at a certain depth in the body of a patient. The degrader structures and necessary beam selectors after the degrader allow only a fraction of the total beam current to pass to the patient. This means that the efficiency in beam delivery of cyclotron facilities is reduced for lower beam energies, and that rather complicated and costly energy degrader have to be provided which additionally generate large amounts of unwanted radiation and require relatively long adjustment times to switch from one energy to the next. In contrast to cyclotrons, a linear accelerator allows for generating the ion beam within a wide range of energies with high efficiency and fast energy switching times. These advantages make a linear accelerator facility potentially much cheaper than a cyclotron facility and it is therefore assumed that in future ion therapy apparatus, the demand for linear accelerators will increase.

The main component of a linear accelerator is an arrangement of cavity resonator structures in which the ions are accelerated by means of resonant RF electromagnetic fields. However, RF resonator structures are currently very expensive due to high manufacturing costs. Moreover, RF cavity resonators are used as entrance stages or intermediate stages in larger accelerator assemblies, or as resonator structures in cyclotrons or synchrotrons. In addition, so-called bunchers are used for manipulating the longitudinal phase space, for the focusing of particle packets ("bunching") in time or for defocusing of such bunches ("de-bunching"). These intermediate stages can be used together with further linear or circular accelerating structures. Some RF cavity resonators have tubular structures inside, such as so-called drift tubes.

FIG. 1 is a perspective view of a section of an exemplary linear accelerator 10 according to prior art, taken from WO 2011 144222 A1, which comprises a radio-frequency cavity resonator. The linear accelerator shown is a so-called drift tube accelerator. This prior art drift tube accelerator comprises an elongate cylindrical vessel 10, of which only a virtual slice is shown for illustration purposes in FIG. 1. Along the longitudinal axis of the vessel 10, a plurality of drift tubes 12 are disposed, of which only two are shown in the slice of FIG. 1. The drift tubes 12 are mounted via elongate support structures 14. Each drift tube 12 comprises an opening 16 for passing a particle beam. Also shown are openings 18 through which the drift tubes 12 and the corresponding support structures 14 are inserted into the vessel 10 to be mounted on a carrier or girder 20. While only two drift tubes 12 with corresponding support structures 14 are shown in FIG. 1, the person skilled in the art will appreciate that in a drift tube linear accelerator, much larger numbers of closely space drift tubes 12 may be provided.

The vessel 10 shown in FIG. 1 forms a tubular structure extending along a longitudinal axis. While this tubular structure as such can in principle be manufactured efficiently at reasonable cost, the mounting of the drift tubes 12 via the support structures 14 is extremely cumbersome, as very precise manual adjustment is required when mounting the drift tubes 12 via the support structures 14 to the girder 20. One difficulty associated with this design is that since the girder 20 is outside the tubular structure 10, the support structures 14 at some point must penetrate through the wall of the tubular structure 10. And since during operation a vacuum is formed in the tubular structure 10, a tight and reliable sealing must be provided between the support structures 14 and the tubular structure 10. The second difficulty is related to the high precision required for mounting of the drift tubes 12. As seen from FIG. 1, when mounting the support structures 14 at the girder or carrier 20, any deviation from the optimal mounting positions is amplified at the location of the drift tubes 12, due to the cantilever or leverage effect associated with the elongate support structures 14.

In alternative designs, the support structures 14 would not extend through the wall of the vessel 10 (tubular structure), but could be directly mounted to the inside wall of the tubular structure 10, for example by brazing. However, this mounting is extremely cumbersome and has to be carried out with highest precision, thereby raising the manufacturing efforts and associated costs.

Figure 2A:
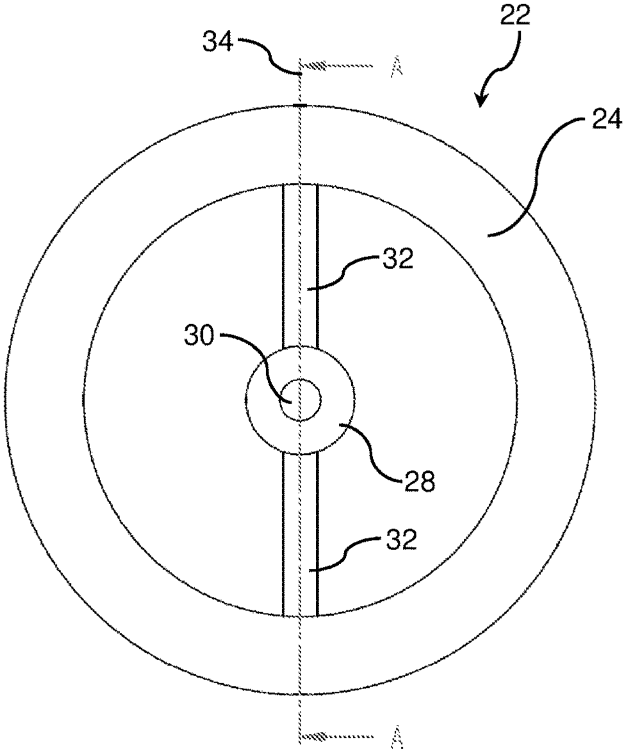
Figure 2B:
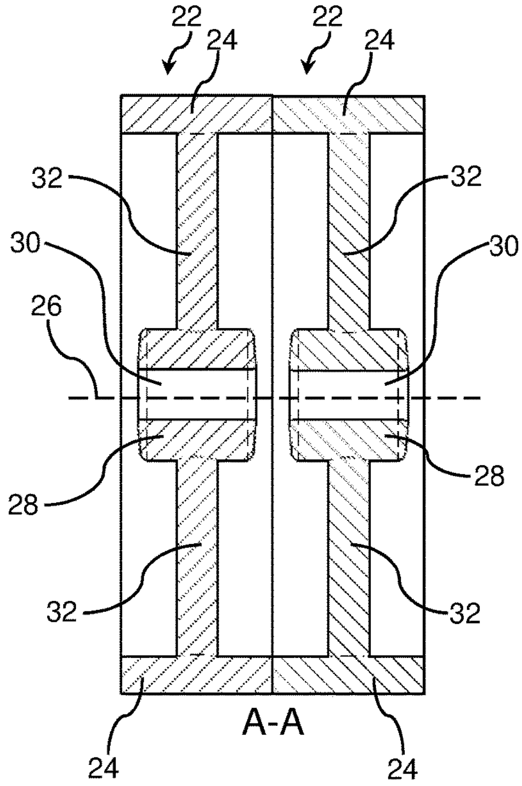
Figure 2C:
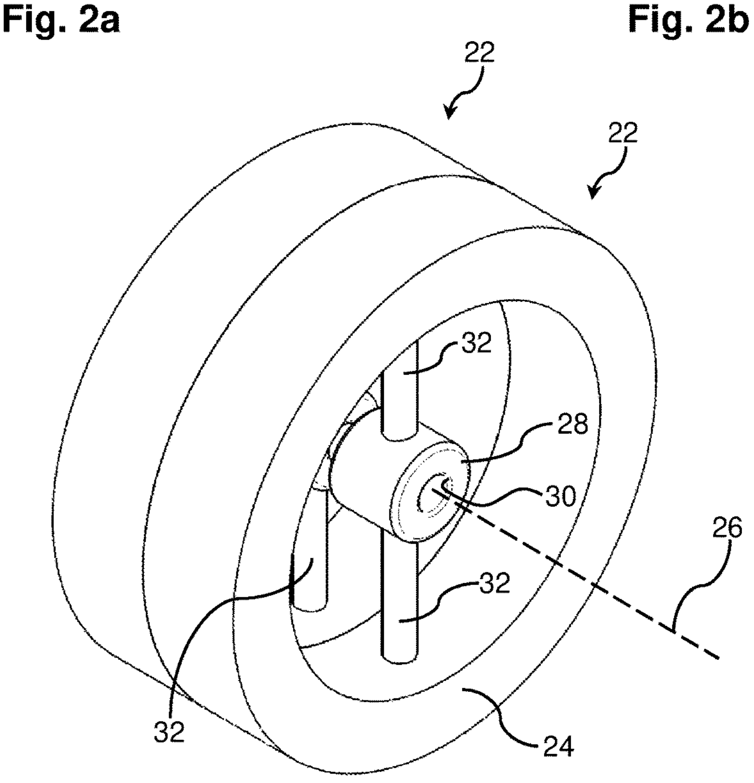

In view of these difficulties, it has been further proposed in prior art to replace the continuous tubular vessel structure 10 of the type shown in FIG. 1 by a plurality of annular segments 22 as shown in FIGS. 2*a* to 2*c*. As is seen in FIGS. 2*a* to 2*c*, each of the annular segments 22 comprises a circumferential wall part 24 surrounding a longitudinal axis 26 and a tubular element 28 having a bore 30, wherein said tubular element 28 is arranged such that the bore 30 is aligned with the longitudinal axis 26. Moreover, with each tubular element 28, two support structures 32 are associated, which are provided on opposite sides of the tubular element 28 and extend radially along a diameter 34 (see FIG. 2*a*) of the circumferential wall part 24 between the tubular element 28 and a corresponding one of two opposite parts of the circumferential wall part 24. The support structures 32 in combination acquire the function of a single support structure 14 of FIG. 1.

Note that it would be generally sufficient to provide only one of the support structures 32, similar to what is shown in FIG. 1. This could even appear advantageous, because, one would often wish to avoid any additional structure within the inner volume of the tubular structure or vessel 10 such as to not interfere with the RF fields forming therein and thus reducing the quality factor of the resonator However, using two support structures 32 can be advantageous for manufacturing purposes and also for a better stability. Each of the annular segments 22 can be manufactured in one piece by subtractive machining procedures. Then, the individual annular segments 22 can be connected with each other in a conductive manner, for example by brazing or electron-beam welding, as shown for only two annular segments 22 in FIGS. 2*b* and 2*c*, such that the connected circumferential wall parts 24 (and those of further annular segments 22 not shown) in combination form the tubular vessel structure. While the design shown in FIGS. 2*a* to 2*c* has some advantages over the design shown in FIG. 1 in that the drift tubes 28 and the support structures 32 do not have to be manufactured separately and later on mounted to the vessel wall, the manufacturing costs are still very high.

In the art, there currently does not exist a cost efficient way of manufacturing radio-frequency cavity resonators having a tubular structure and tubular elements arranged within the tubular structure, such as for example the drift tubes 12 and 28 arranged in the vessel 10 or a tubular structure formed by the circumferential wall parts 24 shown in FIG. 1 and FIG. 2*a* to FIG. 2*c*, respectively.

CN 107396528 a discloses a manufacturing method of an edge-coupled standing wave accelerator tube. In this manufacturing method, 3D printing technology is used to produce an integrated single-cycle acceleration cavity unit. This printed single-cycle acceleration cavity unit is then subjected to a heat treatment. Thereafter, abrasive materials are used to mechanically polish the single-cycle acceleration cavity unit, followed by a multistep cleaning process, including chemical cleaning, cleaning with de-ionized water, high-pressure flushing with a water pressure greater than 20 bar and a drying step.

SUMMARY OF THE INVENTION

The problem underlying the present invention is to provide a method of manufacturing a radio-frequency cavity resonator having a tubular structure extending along a longitudinal axis and a plurality of tubular elements, in particular drift tubes, arranged within the tubular structure, and each having a bore and arranged such that the respective bore is aligned with the longitudinal axis of the tubular structure, that is more cost efficient than the manufacture according to prior art. As will be explained below, this problem is solved by a new manufacturing method relying on a new RF cavity resonator design. Moreover, the same problem is also solved in an alternative manner by a manufacturing method relying on a further new RF cavity resonator design. Preferable embodiments are defined in the dependent claims.

According to one aspect, the present invention provides a method of manufacturing a radio frequency cavity resonator, wherein said radio frequency cavity resonator comprises

- a tubular structure extending along a longitudinal axis, said tubular structure comprising a circumferential wall structure surrounding said longitudinal axis,
- one or more tubular elements, in particular drift tubes, arranged within said tubular structure, each having a bore and arranged such that the respective bore is aligned with said longitudinal axis of said tubular structure, and
- a first and a second support structure associated with each of said tubular elements, wherein said first and second support structures are provided on opposite sides of each tubular element and extend radially along a diameter of the tubular structure between the tubular element and a corresponding one of two opposite wall structure portions of said tubular structure.

Moreover, the method comprises producing the entire resonator, or at least longitudinal sections thereof that are subsequently assembled to form the resonator, by additive manufacturing in a manufacturing direction that is parallel to said diameter, wherein said first support structure is produced first and said second support structure is produced thereafter. Herein said additive manufacturing comprises forming said support structures such that

- in a cross-sectional plane that is perpendicular to the longitudinal axis and includes the diameter, the width of at least said second support structure, preferably the width of both support structures increases in radially outward direction, wherein in this cross-sectional plane, said width is the width in a direction perpendicular to the diameter of the tubular structure, and such that
  - in a longitudinal sectional plane that includes the longitudinal axis and the diameter, at least said second support structure, preferably both support structures are formed to have a radially outer portion, in which the width increases in radially outward direction, wherein in this longitudinal sectional plane, said width is the width in longitudinal direction.

Note that although additive manufacturing has been used for a large variety of products in the art, the structure of an RF cavity resonator according to the known designs, which include a tubular outer structure, additional tubular elements and the support structures connecting the same would not lend itself for this manufacturing method. In particular, it would not be obvious to the person skilled in the art to even attempt manufacturing a tubular structure by additive manufacturing in a manufacturing direction that is parallel to the diameter.

Figure 3A:
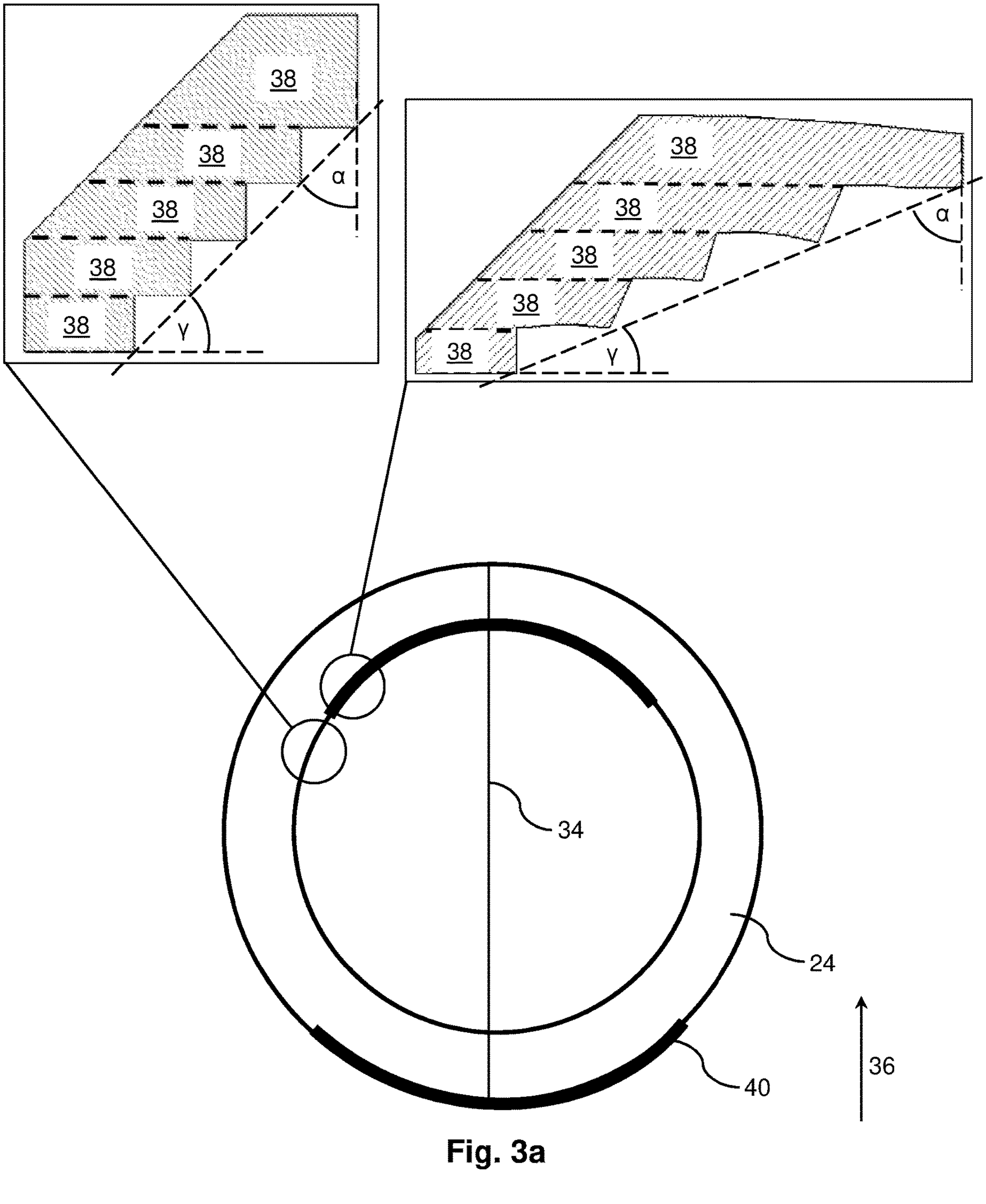

This becomes apparent from FIG. 3*a*, in which a tubular structure 24 having a diameter 34 is shown. As the skilled person will appreciate, in additive manufacturing, the produced structure is formed layer by layer in a manufacturing direction. In the following, "additive manufacturing" is also referred to as "3D printing" for short. A powder-like material is selectively solidified by selective melting or sintering, for example using an electron beam or a laser beam. In FIG. 3*a*, the manufacturing direction is indicated by an arrow 36, i.e. vertically upwards, and individually formed layers 38 are schematically shown in the enlarged portions of the figure. Due to this consecutive buildup of layers 38, it is difficult to form overhanging structures, where one layer 38 projects significantly over the previously formed layer 38. In FIG. 3*a*, regions of the tubular structure 24 that cannot be readily formed by additive manufacturing due to the formation of overhangs are schematically indicated by the thick lines 40.

This is illustrated in more detail in the enlarged portions in FIG. 3*a*. The left enlarged portion in the illustration of FIG. 3*a* shows the layer structure in a region where the overhang is still sufficiently small that a manufacture with a desired precision is still feasible. Herein, a certain degree of manufacturing precision must always be ensured in order to allow for a sufficiently high Q factor of the resonator, and the requirements in this case tend to be higher than in conventional applications of additive manufacturing, in particular in preferred embodiments, where the surfaces are not additionally treated after the additive manufacturing. The degree of the overhang is quantified by the overhang-angle $\gamma$ shown in the illustration, which is the angle of the tangent of the side surface (or edge in the sectional view) to the horizontal plane. For the definition of suitable structures, in the following reference is sometimes made to the complementary angle $\alpha$, i.e. $\alpha=90°-\gamma$, which is the angle of the tangent of the side surface/edge of the formed structure to the diameter 34, which in this case defines the manufacturing direction 36. Small values of $\alpha$ (i.e. large values of $\gamma$) indicate small overhangs, and can be manufactured with desired precision. However, if $\gamma$ becomes too low, the precision of the formed overhanging edge/surface will deteriorate, as is symbolically represented by the right enlarged portion in FIG. 3*a*. As is seen therein, the individual layers 38 deform in their overhanging portions, thereby leading to a deviation from the intended structure, and hence to a reduced manufacturing precision.

This explains why certain regions 40 of the tubular structure 24 can generally not be printed in a direction that is parallel to the diameter 36, at least not in applications such as an RF cavity resonator, where high manufacturing precision is required. This is also the reason why the skilled person would not have considered 3D-printing a tubular structure in a manufacturing direction along a diameter thereof. Instead, tubular structures in the art would, if at all, typically be 3D-printed along the axial direction.

Indeed, printing a tubular structure along its longitudinal axis would be a possible and cost efficient way of manufacturing a tubular vessel as the vessel 10 shown in FIG. 1 by itself, but this would not easily allow for simultaneously forming the tubular elements (such as the drift tubes 12 of FIG. 1) or their support structures in the same 3D-printing process.

Figure 3B:
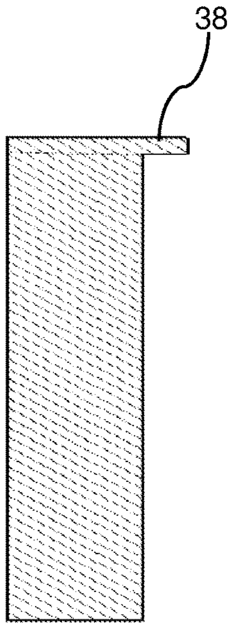
Figure 3C:
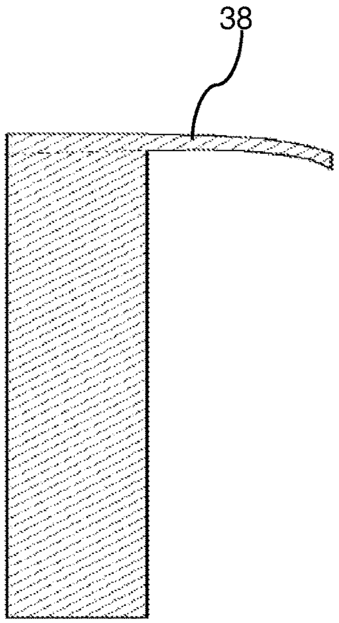

For completeness, it ought to be acknowledged that there are more restrictions to the manufacturability by 3D printing that are to be taken into consideration. FIGS. 3*b* and 3*c* schematically illustrate two examples of overhangs of individually printed layers 38, with the shorter overhang in FIG. 3*b* presenting the desired structure, while the overhang in FIG. 3*c* is so long that it leads to a deformation that will also affect succeeding layers 38 (not shown) printed thereon.

Figure 3D:
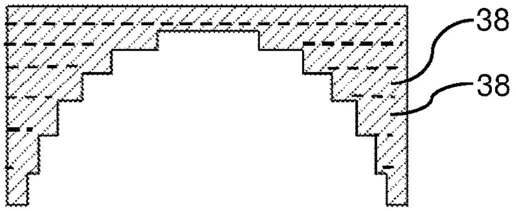
Figure 3E:
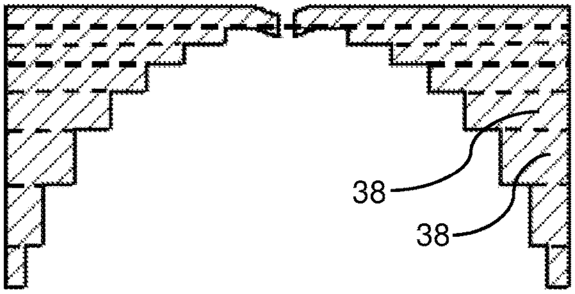

Moreover, the discussion of the possible overhang angles with reference to FIG. 3*a* does not yet capture the complete picture for all situations. For example, when an arcuate structure is formed, as is schematically shown in FIG. 3*d* and FIG. 3*e*, close to the apex of the arc, smaller overhang angles $\gamma$ may occur. In this case, it has been found that whether or not an arcuate structure can be printed with the desired precision depends mainly on the radius of curvature of the arcuate structure at its apex and the resulting overhangs length of a printed layer as shown schematically in FIGS. 3*b* and 3*c*. FIG. 3*d* schematically illustrates a structure that allows for the formation of an article with a desired precision (although the overhang angle $\gamma$ decreases towards the apex), while FIG. 3*e* shows a situation where the radius of curvature is too large and the desired structure cannot be formed. Generally, for a given manufacturing process, raw material and available layer thicknesses, one can determine a maximum radius of curvature at the apex of an arcuate structure up to which the arcuate structure can be built additively with desired precision.

According to the present invention, contrary to the usual practice for tube structures, the RF cavity resonator is formed by additive manufacturing along a manufacturing direction that is parallel to the diameter of the tubular structure.

Indeed, this becomes possible by the specific way the support structures are formed, both in their geometry as well as with respect to the manufacturing direction. According to the invention, at least said second support structure is formed such that in a cross-sectional plane—which is understood herein as a plane perpendicular to the longitudinal axis and including the diameter along which the support structure extends—the width thereof increases in radially outward direction. Herein, with reference to the cross-sectional plane, the width is the width in a direction perpendicular to the diameter of the tubular structure.

In addition, at least said second support structure is formed such that in a longitudinal sectional plane—which is understood herein as the plane that includes the longitudinal axis and the diameter—it has a radially outer portion, in which the width increases in radially outward direction, wherein in this longitudinal sectional plane, said width is the width in longitudinal direction. Indeed, as will be demonstrated below, with this new geometry, it becomes possible to generate the tubular structure, the support structures and the tubular elements all in a same 3D printing process along a manufacturing direction parallel to the diameter along which the support structures extend, while still leading to a fully functional RF cavity resonator having a sufficiently high Q-factor.

In particular, due to the radially outward increase in width of at least said second support structure in the cross-sectional plane, in combination with the radially outward increase in width of the radially outer portion of at least said second support structure in the longitudinal sectional plane, the upper portion of the tubular structure can be printed, contrary to what is suggested by FIG. 3*a*. Herein, the adjective "upper" in "upper portion" is used with reference to the manufacturing direction 36, which is assumed to be vertically upwards. Accordingly, any upper part is printed after a lower part. Note that from an additive manufacturing point of view, this increase in width in the radially outer portion is not mandatory for said first support structure, which is why this limitation strictly applies only for said second support structure. However, in preferred embodiments the geometry of said first and second support structures is at least approximately symmetrical, such that the same features preferably also apply for said first support structure.

As is seen from the above explanation, the method of the invention requires a specific geometry of the components of the RF resonator structure that enables additive manufacturing thereof. Accordingly, a second aspect of the present invention relates to a RF cavity resonator that is specifically devised for this manufacturing method.

This RF resonator structure comprises a tubular structure extending along a longitudinal axis, said tubular structure comprising a circumferential wall structure surrounding said longitudinal axis, one or more tubular elements, in particular drift tubes, arranged within said tubular structure, each having a bore and arranged such that the respective bore is aligned with said longitudinal axis of said tubular structure, and a first and a second support structure associated with each of said tubular elements, wherein said first and second support structures are provided on opposite sides of each tubular element and extend radially along a diameter of the tubular structure between the tubular element and a corresponding one of two opposite wall structure portions of said tubular structure. It goes without saying that wherever reference is made to “first and second support structures” or “two support structures”, this is to be understood in the sense of “at least two”, and does not exclude the possibility that more than two support structures are provided.

Moreover, in order to facilitate that the entire resonator, or at least longitudinal sections thereof that can be assembled to form the resonator, is or are suitable for producing by additive manufacturing in a manufacturing direction that is parallel to said diameter, the geometry of the support structures is defined as follows:

In a cross-sectional plane that is perpendicular to the longitudinal axis and includes the diameter, the width of at least said second support structure, preferably the width of both support structures increases in radially outward direction. As before, the width referred to herein is the width in a direction perpendicular to the diameter of the tubular structure.

Moreover, in a longitudinal sectional plane that includes the longitudinal axis and the diameter, at least said second support structure, preferably both support structures comprise a radially outer portion, in which the width increases in radially outward direction. Herein, in the longitudinal sectional plane, said width is the width in longitudinal direction.

In preferred embodiments of the method or the resonator, in said longitudinal sectional plane that includes the longitudinal axis and the diameter, at least one, preferably both of said support structures have a middle portion in which the width of the support structure assumes its minimum value. In this longitudinal sectional plane, said width is again the width in longitudinal direction.

In preferred embodiments of said method or resonator, in said longitudinal sectional plane that includes the longitudinal axis and the diameter, at least said first support structure, preferably both of said support structures may have a radially inner portion, in which the width increases in radially inward direction. In this longitudinal sectional plane, said width is again the width in longitudinal direction.

The fact that in the longitudinal sectional plane, the width of the radially inner portion increases in radially inward direction and the width of the radially outer portion increases in the radially outward direction allows for a comparatively slim middle portion, thereby increasing the cavity volume that is not occupied by the material forming said support structures and allowing for a higher Q factor.

In a preferred embodiment of the method or the resonator, at the radially outward ends of the radially outer portion of at least said second support structure, preferably of both support structures, where the respective support structure reaches said circumferential wall of said tubular structure, the longitudinal width is such that an adjacent support structure associated with an adjacent tubular element in the finished resonator touch each other, or are less than 5 mm, preferably less than 2.5 mm apart from each other.

Herein, reference is made to the “finished resonator” to account for cases where the resonator is made from individually fabricated longitudinal sections which are assembled with each other to form the complete RF cavity resonator, and where adjacent support structures could be support structures from different prefabricated longitudinal sections. However, in this case too, the radially outward ends of the radially outer portions at least of said second support structures which are adjacent after this assembly should touch each other or at least be less than 5 mm, preferably less than 2.5 mm apart from each other. Graphically speaking, this ensures that the upper part of the tubular structure (such as the part schematically emphasized with the upper thick line 40 in FIG. 3*a*) will be supported by the radially outer portions of the support structures over its entire or almost entire longitudinal length, with gaps of no more than 5 mm, preferably no more than 2.5 mm in between, such that this part of the tubular structure is sufficiently supported.

In a preferred embodiment, a continuous transition is formed between the radially outward ends of the radially outer portions of at least adjacent second support structures, preferably of both adjacent first and adjacent second support structures, wherein in said longitudinal sectional plane, the transition forms a transition edge, and wherein the radius of curvature of said transition edge at the position where the tangent is parallel to the longitudinal axis is 8 mm or less, preferably 6 mm or less and most preferably 4 mm or less.

As will become more apparent with reference to specific embodiments illustrated below, this transition typically forms an arcuate structure similar to what is shown in FIG. 3*d* and FIG. 3*e*, and the position where the tangent is parallel to the longitudinal axis corresponds to the apex of the arcuate structure. Such arcuate structures can be formed with high precision if the radius of curvature is chosen sufficiently small.

In a preferred embodiment, in said cross-sectional plane, the edges of at least said second support structure, preferably of said first and the second support structures have an average angle $\alpha$ with respect to the diameter that is at least 25°, preferably at least 30° and most preferably at least 35°. Note that the angle $\alpha$, being defined with respect to the manufacturing direction, is complementarity to the “overhang angle” such as the overhang angle $\gamma$ that was illustrated in FIG. 3*a*. This angle $\alpha$ should be chosen large enough such as to support a sufficiently large circumferential part at the top of the tubular structure, where the term “top” again is understood with respect to the vertically upward manufacturing direction.

Moreover, again in said cross-sectional plane, in a preferred embodiment, the edges of at least said second support structure, preferably of said first and the second support structures have an average angle $\alpha$ with respect to the diameter that is at most 60°, preferably at most 52° and most preferably at most 45°. Choosing such upper boundary for the angle $\alpha$ of the edges of the support structure has two reasons. The first is that smaller angles $\alpha$ mean that less of the resonator cavity space is occupied by the support structure, such that the Q factor can be higher. The second reason is that this allows for avoiding too much overhang of this edge, or in other words, too small overhang angles $\gamma$, where as before, $\gamma=90°-\alpha$.

In a preferred embodiment, in said cross-sectional plane, the edges of one or both of said first and second support structures are straight along at least 70%, preferably along at least 80% of their length.

With respect to the geometry of the support structure in said longitudinal sectional plane, the minimum value of the width of one or both of said first and second support structures is preferably less than 50%, more preferably less than 40%, even more preferably less than 30% and most preferably less than 20% of the longitudinal length of the corresponding tubular element. This reduced width of the support structure in longitudinal direction allows limiting the space occupied by the support structure, to thereby increase the fraction of the unoccupied cavity and allows for an increased Q factor.

In a preferred embodiment, the radial length of said radially outer portion of one or both of said first and second support structures is longer than the radial length of said radially inner portion.

In preferred embodiments, in said longitudinal sectional plane, the edges of the radially inner portions of one or both of said first and second support structures are straight or concave.

In preferred embodiments, in said longitudinal sectional plane, the edges of the radially outer portions of one or both of said first and second support structures are straight or convex.

In a particularly preferred embodiment, a duct for carrying cooling fluid is formed in said support structures. Such a duct is difficult to form using subtractive methods, especially for RF cavity resonators of smaller size, where the diameter of the support structures is small. In the context of the present invention, however, the ducts can be simply formed while printing the RF cavity resonator. This is particularly convenient since the manufacturing direction and the extension direction of the support structures coincide.

Herein, the ducts of two support structures associated with a same tubular element are preferably connected with each other. In a preferred embodiment, each of the support structures comprises a first duct and a second duct, wherein the first ducts and the second ducts of the support structures are connected with each other via a first cavity and a second cavity provided in the tubular element, respectively. Herein, the first and second cavities are arranged on opposite sides of the bore in said tubular element. This structure allows for an efficient cooling of the tubular element, while at the same time allowing for additive manufacturing, as will become apparent from a specific embodiment illustrated below.

In a preferred embodiment, said resonator is made from copper, aluminium, silver, metallic superconducting material, in particular niobium, or high-temperature superconducting material. In particularly preferred embodiments, the bulk of the resonator is made from high purity copper having a copper content of 99.9% or more.

In a preferred embodiment, said resonator has between 3 and 10, preferably between 5 and 8 tubular elements.

In preferred embodiments, said resonator is a resonator for or in a drift-tube linear accelerator (DTL), a side coupled DTL, a coupled cavity DTL, a coupled cavity linear accelerator or a buncher.

In a preferred embodiment, the outer circumference of said tubular structure has a square or an octagonal shape. Herein, two of the sides of the square or octagon are preferably perpendicular to the manufacturing direction. Note that the natural outer shape for a tubular structure would be circular, as shown in FIG. 1, FIGS. 2*a* to 2*c*, and FIG. 3*a*. However, as seen in FIG. 3*a*, such a shape does not lend itself to additive manufacturing along the diameter 34, since the lower region emphasized by the thick line 40 will have excessive overhangs. This can be avoided by using an outer circumference that has a square or octagonal shape. Herein, the octagonal shape is particularly preferred, since it allows for a more efficient use of the material.

In preferred embodiments, said additive manufacturing is based on electron beam melting, selective laser sintering or selective laser melting.

According to a second aspect, an alternative method of manufacturing a radio frequency cavity resonator of an alternative design is provided. The radio frequency cavity resonator of this alternative design comprises

- a vessel structure extending along a longitudinal axis, said vessel structure comprising a circumferential wall structure surrounding said longitudinal axis,
- one or more tubular elements, in particular drift tubes, arranged within said vessel structure, each having a bore and arranged such that the respective bore is aligned with said longitudinal axis of said vessel structure, and
- a support structure associated with each of said tubular elements, said support structure having a first end attached to a portion of said circumferential wall structure and a second end attached to said tubular element, Moreover, the method comprises producing the entire resonator, or at least longitudinal sections thereof that are subsequently assembled to form the resonator, by additive manufacturing in a vertically upward manufacturing direction. Said vessel structure has a bottom portion with respect to the vertically upward manufacturing direction, at which said first end of said support structure is formed, and an upper portion, in which inner surface portions of said wall structure on both sides of a longitudinal vertical sectional plane converge towards each other in vertically upward direction such as to form a pitched roof type structure. Herein, said longitudinal vertical sectional plane is a plane that is parallel to said vertically upward manufacturing direction and includes said longitudinal axis.

Throughout this upper portion of said vessel structure, the slope of said inner surface of said wall structure with respect to a horizontal plane is at least 30°, preferably at least 38° and most preferably at least 45°, wherein said horizontal plane is a plane that is perpendicular to said vertically upward manufacturing direction.

This embodiment differs from the embodiment described above in that it does not necessarily require two support structures arranged at opposite sides of each tubular element. In the previous embodiment, said second support structure, and in particular the fact that it extended in width in its radial outer portion allowed for forming the horizontal top portion of the tubular wall structure by additive manufacturing. In the alternative embodiment, this second support structure may be omitted altogether. Instead, in this design, the inner surface portions of said wall structure on both sides of said longitudinal vertical sectional plane converge towards each other in vertically upward direction such as to form a pitched roof-type structure. This structure allows for keeping the slope of said inner surface of said wall structure with respect to a horizontal plane sufficiently high such as to allow for additive manufacturing. Note that the slope angle can be regarded as the local value of the "overhang-angle γ" introduced in FIG. 3*a* and the corresponding description. In this embodiment, this slope with respect to the horizontal plane should be at least 30°, preferably at least 38° and most preferably at least 45°.

In the definition of this alternative design, reference is made to a "vessel structure" rather than to a "tubular structure". This different wording is used for better distinguishing the two structures, but should not imply any limitation of the scope of the "tubular structure". In particular, a "tubular structure" may be generally cylindrical, but this is not necessary and shall not be implied by the term "tubular" as used in the present disclosure.

Note that the term "pitched roof-type structure" is used in an explanatory, illustrative manner and should be interpreted broadly. If the slope angle of the inner surface of the wall structure is constant throughout this upper portion of said vessel structure, the upper portion has a cross-sectional shape corresponding to an inverted "V", with the apex located in the longitudinal vertical sectional plane, and hence has the shape of a "pitched roof". However, the slope angle may vary within the upper portion, as long as it remains above the aforementioned lower boundaries, and such a design would still be regarded as a "pitched roof-type structure".

According to this aspect, a radio frequency cavity resonator is provided that allows for such manufacturing method. The radio frequency cavity resonator comprises

- a vessel structure extending along a longitudinal axis, said vessel structure comprising a circumferential wall structure surrounding said longitudinal axis,
- one or more tubular elements, in particular drift tubes, arranged within said vessel structure, each having a bore and arranged such that the respective bore is aligned with said longitudinal axis of said vessel structure, and
- a support structure associated with each of said tubular elements, said support structure having a first end attached to a portion of said circumferential wall structure and a second end attached to said tubular element.

The entire resonator, or at least longitudinal sections thereof that are subsequently assembled to form the resonator, is/are suitable for producing by additive manufacturing in a vertically upward manufacturing direction,

- wherein said vessel structure has a bottom portion with respect to the vertically upward manufacturing direction, at which said first end of said support structure is formed, and an upper portion, in which inner surface portions of said wall structure on both sides of a longitudinal vertical sectional plane converge towards each other in vertically upward direction such as to form a pitched roof type structure, wherein said longitudinal vertical sectional plane is a plane that is parallel to said vertically upward manufacturing direction and includes said longitudinal axis,
- and wherein throughout this upper portion of said vessel structure, the slope of said inner surface of said wall structure with respect to a horizontal plane is at least 30°, preferably at least 38° and most preferably at least 45°, wherein said horizontal plane is a plane that is perpendicular to said vertically upward manufacturing direction.

In a preferred embodiment, said resonator of the alternative design is likewise made from copper, aluminium, silver, metallic superconducting material, in particular niobium, or high-temperature superconducting material, wherein preferably, the bulk of the resonator is made from high purity copper having a copper content of 99.9% or more.

In a preferred embodiment, said resonator of the alternative design has between 3 and 10, preferably between 5 and 8 tubular elements.

The resonator of the alternative design may be a resonator for or in a drift-tube linear accelerator (DTL), a side coupled DTL, a coupled cavity DTL, a coupled cavity linear accelerator or a buncher.

In a preferred embodiment of the alternative design, the outer circumference of said vessel structure has a pentagonal shape.

In preferred embodiments of the manufacturing method of the resonator of the alternative design, said additive manufacturing is based on electron beam melting, selective laser sintering or selective laser melting.

SHORT DESCRIPTION OF THE FIGURES

FIG. 1 is a perspective view of a section of a prior art drift tube accelerator.

FIG. 2*a-c* show various views of a pair of prefabricable annular segments of a prior art drift tube accelerator.

FIG. 3*a* is a sectional view of a tubular structure with two enlarged portions schematically illustrating the limitation of additive manufacturing of overhangs.

FIG. 3*b-c* show to schematic illustrations of overhanging individually printed layers.

FIG. 3*d-e* shows schematic illustrations explaining the limitation of additive manufacturing of arcuate structures FIG. 4*a-d* show various views of virtual slices of an RF cavity resonator according to an embodiment of the invention.

FIG. 5*a-d* show various views of virtual slices of an RF cavity resonator according to another embodiment of the invention, including ducts for cooling fluid.

FIG. 6*a-e* show various views of an RF cavity resonator according to an embodiment of the invention.

FIG. 7*a-e* show various views of an RF cavity resonator of an alternative design.

DESCRIPTION OF THE PREFERRED EMBODIMENTS

It is to be understood that both the foregoing general description and the following description are exemplary and explanatory only and are not restrictive of the methods and devices described herein. In this application, the use of the singular may include the plural unless specifically stated otherwise. Also, the use of "or" means "and/or" where applicable or unless stated otherwise. Those of ordinary skill in the art will realize that the following description is illustrative only and is not intended to be in any way limiting. Other embodiments will readily suggest themselves to such skilled persons having the benefit of this disclosure. Reference will now be made in detail to various implementations of the example embodiments as illustrated in the accompanying drawings. The same reference signs will be used to the extent possible throughout the drawings and the following description to refer to the same or like items.

With reference to FIG. 4*a* to FIG. 6*e*, a RF cavity resonator 42 and its manufacturing method will be described. The full RF cavity resonator 42 is only shown in FIG. 6*a-e*, while FIG. 4*a-d* and FIG. 5*a-d* only show virtual slices of the RF cavity resonator 42 from which the structure of its elements or components are more apparent. The full RF cavity resonator 42 is shown to have only three drift tubes 28, corresponding to a comparatively short prototype that was recently built, but it goes without saying that larger numbers, for example 6 to 8 or even 10 or more drift tubes 28 could be included in a resonator of very similar design but larger longitudinal length. The present invention is not limited to any number of drift tubes or other tubular elements.

Moreover, the entire resonator 42 is monolithically 3D-printed, and it is therefore apparent that there is no physical boundary between any of the individual components or portions thereof that will be discussed below. Reference to individual components or portions is mainly made for explaining the geometric structure of the resonator. In the drawings, individual portions/components may be delimited from each other in the figures by dashed lines.

The resonator 42 has a tubular structure extending along a longitudinal axis 26 and comprising a circumferential wall structure 44 surrounding said longitudinal axis 26. The inner circumferential shape of the wall structure 44 is circular, whereas the outer circumferential shape is octagonal.

Within the tubular structure of the resonator 42, three tubular elements, in the shown embodiment drift tubes 28 are arranged. Each drift tube 28 has a bore 30 which is aligned with the longitudinal axis 26 of the tubular structure. Two support structures 32 are associated with each of said drift tubes 28. The support structures 32 are provided on opposite sides of each drift tube 28 and extend radially along a diameter 34 of the tubular structure between the drift tube 28 and a corresponding one of two opposite portions of the circumferential wall structure 44 of said tubular structure. The diameter 34 also indicates the manufacturing direction for the additive manufacture of the RF cavity resonator 42. In the embodiment shown in FIG. 4*a* to FIG. 6*e*, said two support structures 32 associated with each drift tube 28 are symmetrical with respect to the longitudinal axis 26, such that no distinction between "first" and "second" support structures will be made in the following description. It is, however, to be understood that the "first support structure", i.e. the support structure that is arranged lower in vertical manufacturing direction and which is hence manufactured first could have a simplified geometry, for example the geometry shown with reference to an alternative design at reference sign 78 in FIG. 7*a-e*.

As was explained in the summary of the invention above, the support structures 32 have a special geometry that enables the printability of the RF cavity resonator 42 as a whole. FIGS. 4*a-d* and 5*a-d* show two embodiments with slightly different support structures 32, which however mainly agree in the general features discussed above.

Figure 4B:
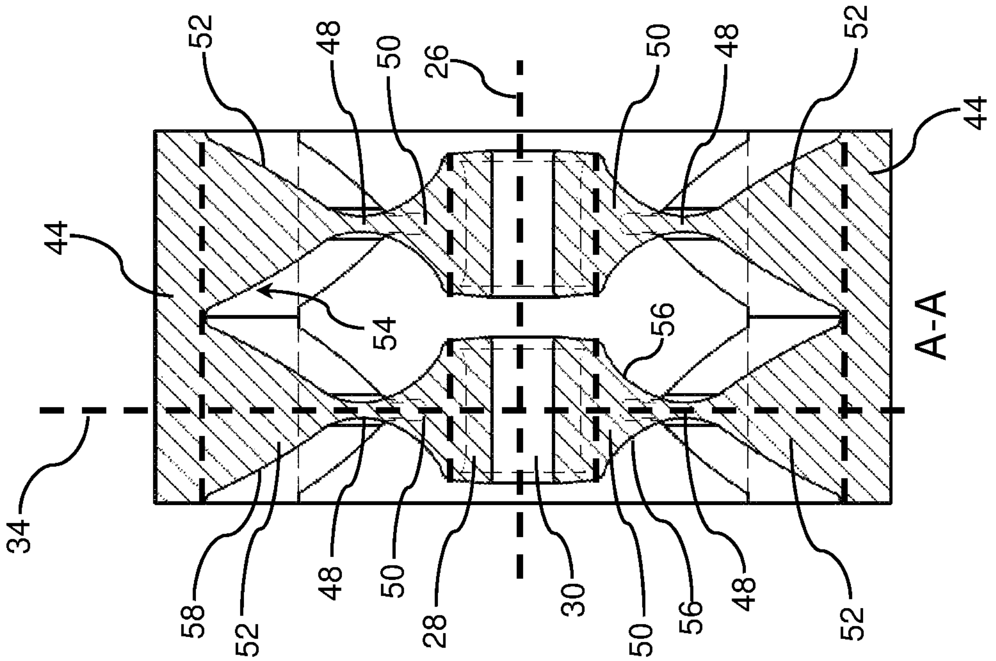
Figure 4A:
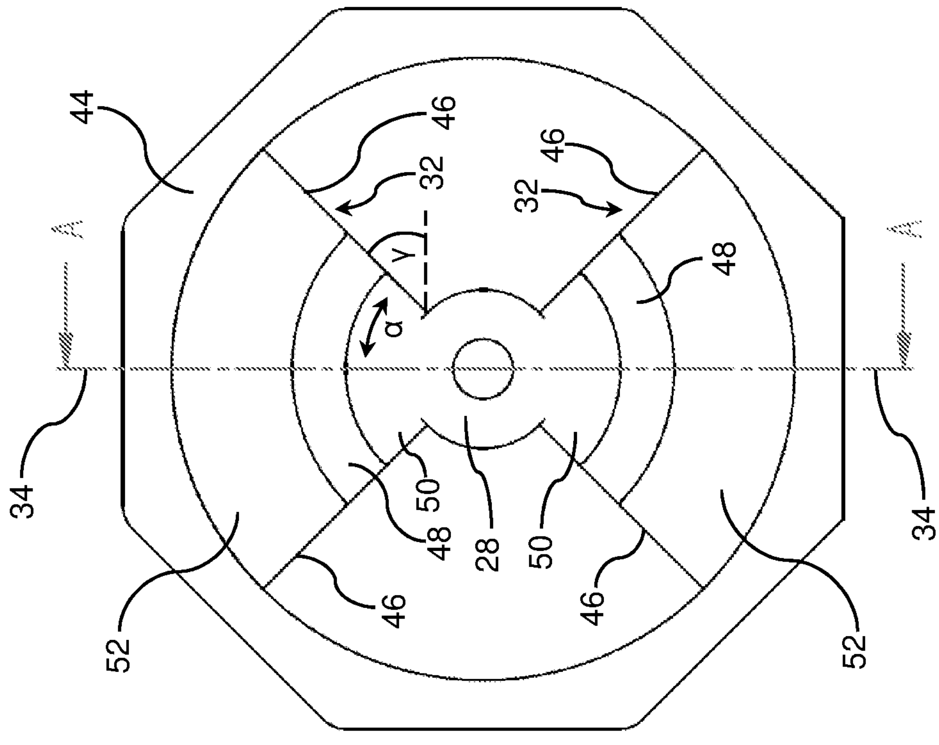
Figure 4D:
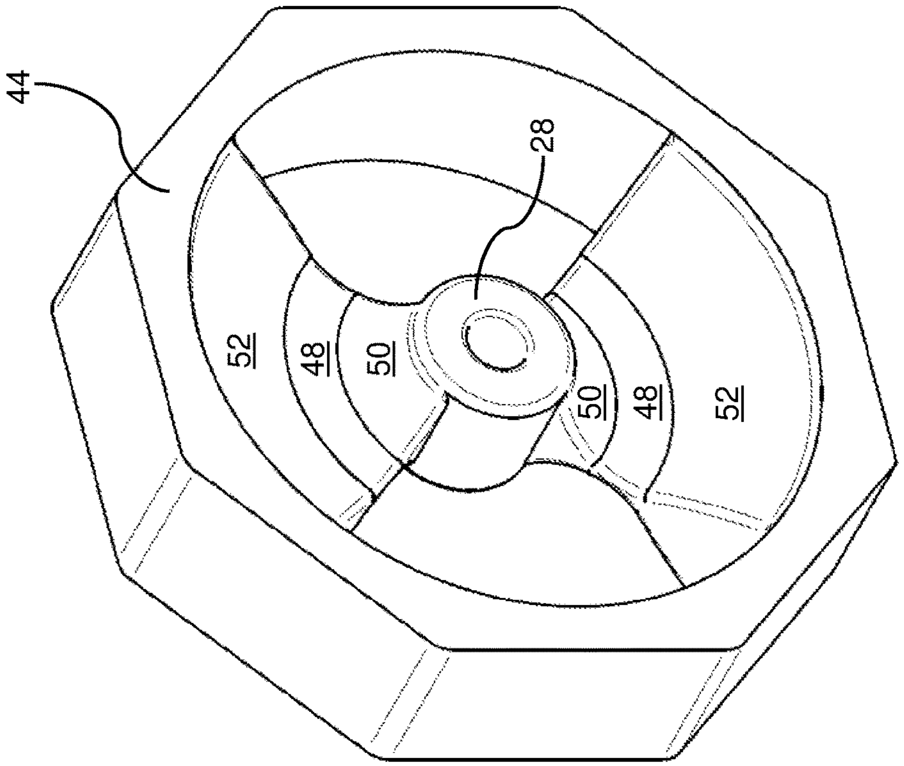
Figure 4C:
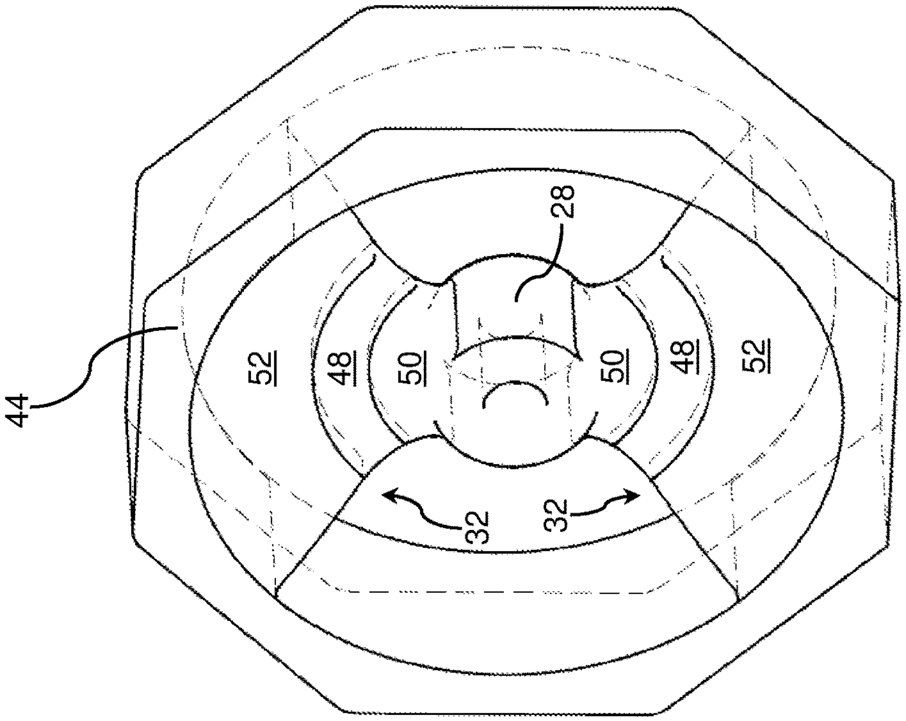
Figure 5B:
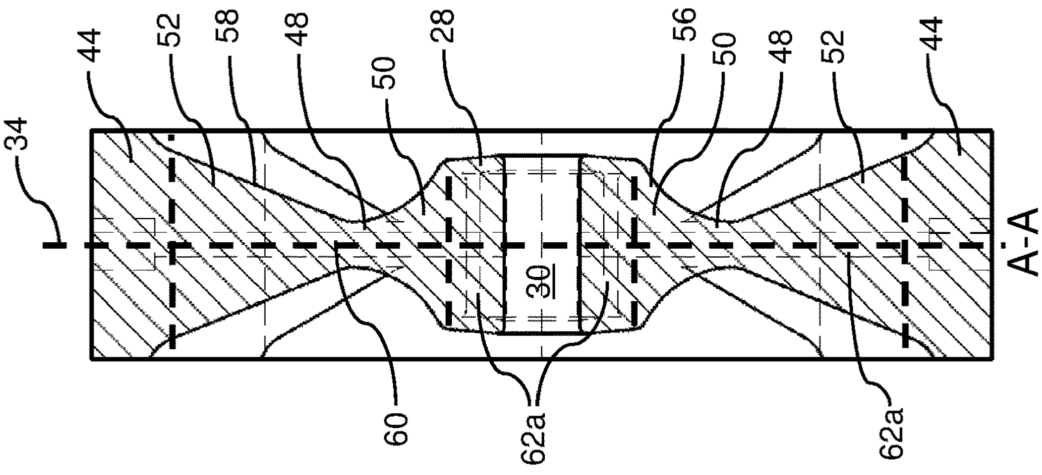
Figure 5A:
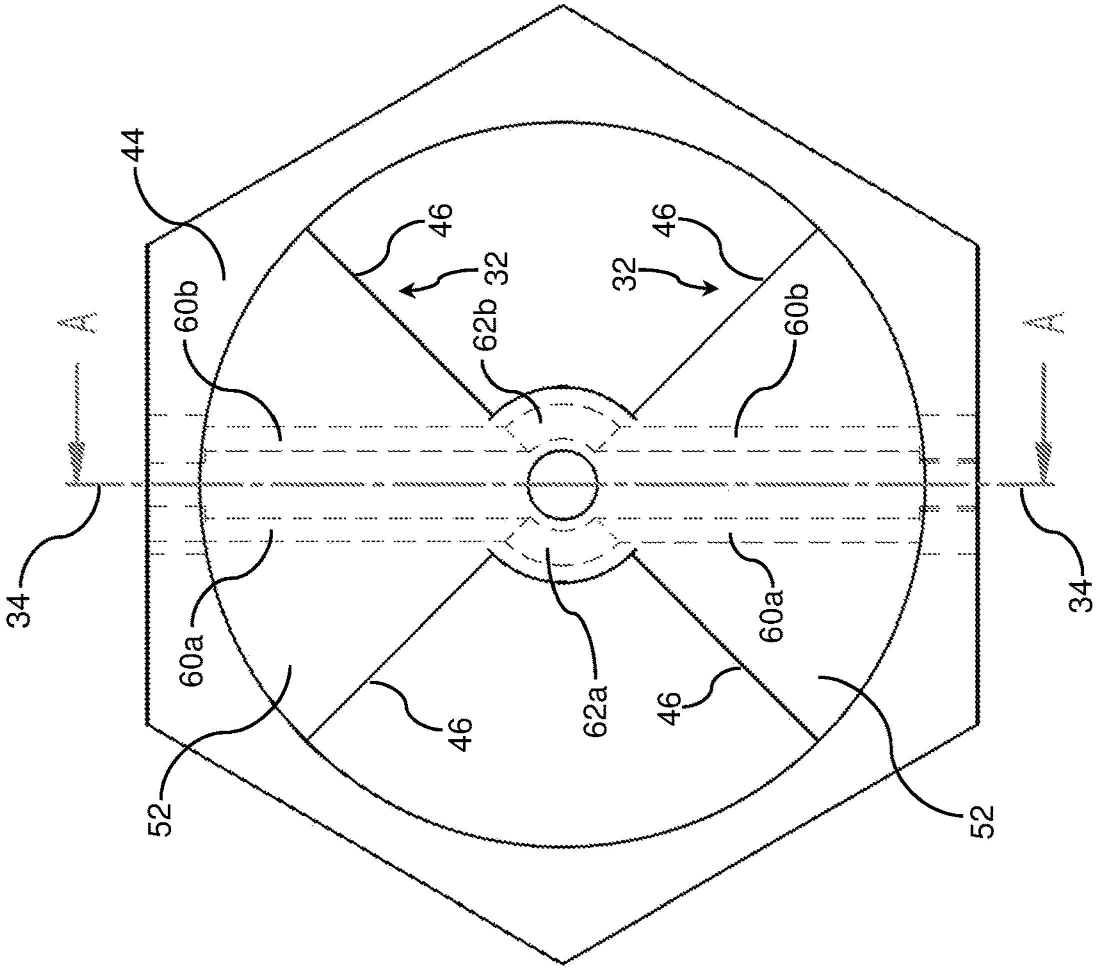
Figure 5C:
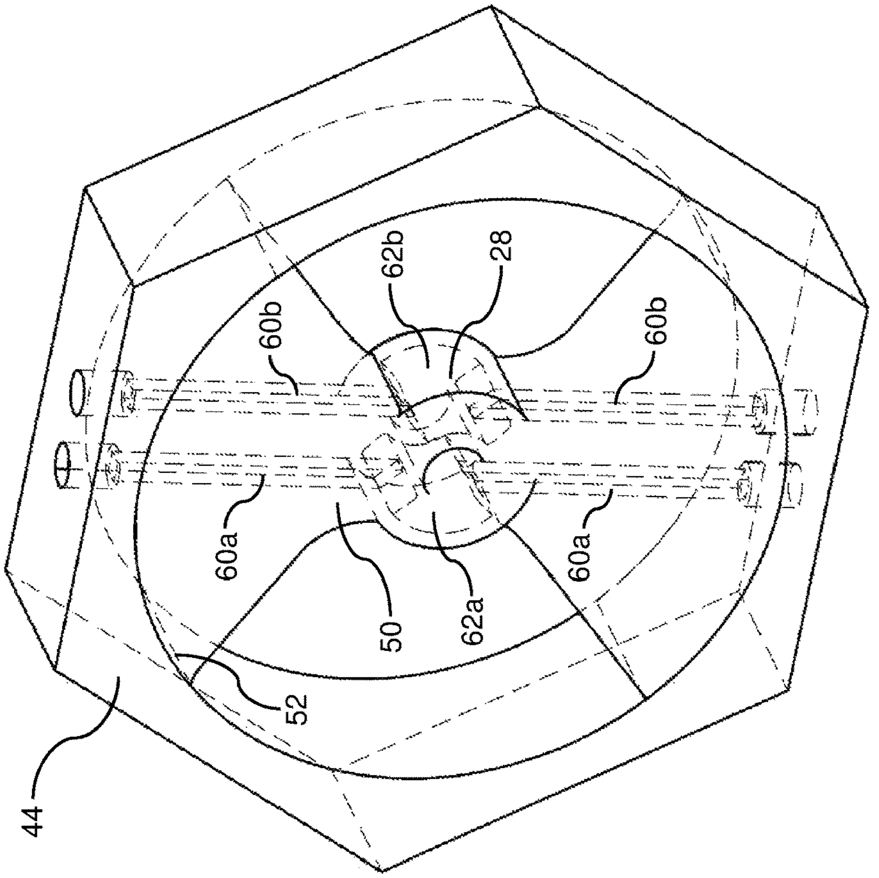
Figure 5D:
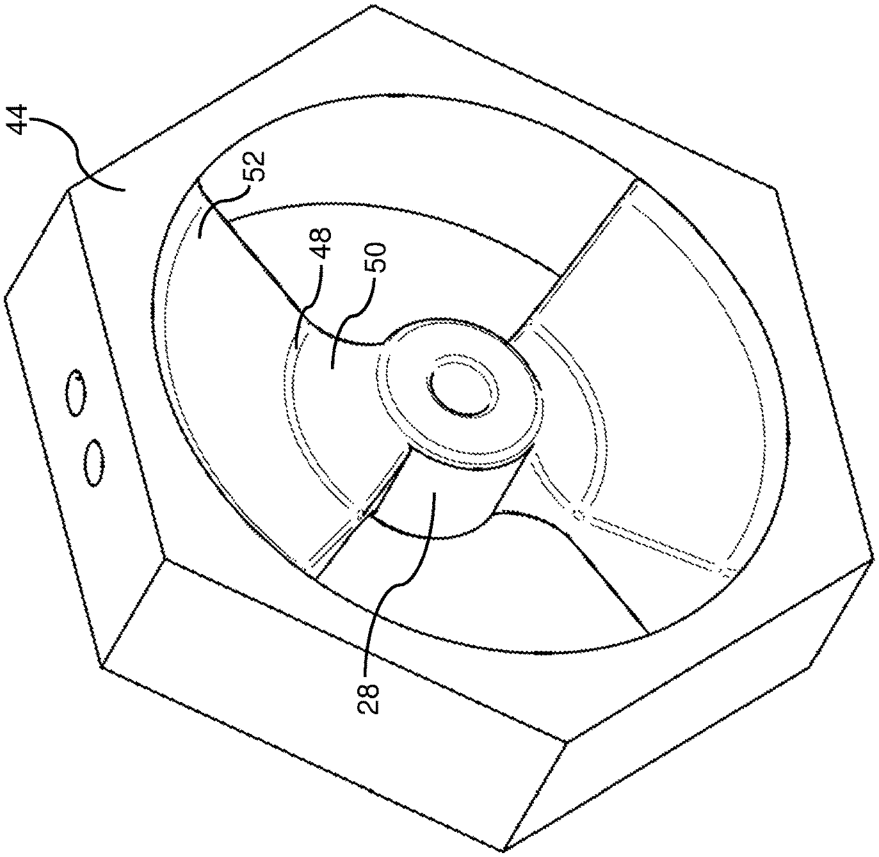

FIGS. 4*a* and 5*a* show a cross-sectional view of a slice of the resonator 42 in a cross-sectional plane that is perpendicular to the longitudinal axis 26 and includes the diameter 34. As is seen in both FIGS. 4*a* and 5*a*, the width of the support structures 32 increases in radially outward direction, wherein in this cross-sectional plane, said width is the width in a direction perpendicular to the diameter of the tubular structure.

As is further seen FIGS. 4*a* and 5*a*, in this cross-sectional plane, the edges 46 of the support structures 32 are straight and have an angle α with respect to the diameter 34 that is approximately 45.

This angle α can also be chosen differently, but for the reasons given above, it should preferably be at least 25°, more preferably at least 30° and most preferably at least 35°. The angle α, which is defined with respect to the diameter 34 and hence the manufacturing direction, is complementary to the "overhang angle" γ that is likewise shown in FIGS. 4*a* and 5*a*. The angle α should be chosen large enough such as to support a sufficiently large circumferential part at the top of the circumferential wall structure 44, where the term "top" again is understood with respect to the vertically upward manufacturing direction, and is also the top in FIGS. 4*a* and 5*a*. At the same time, the angle α should not be too large such that the "overhang angle" γ does not become too small, to ensure that the support structure 32 can be printed with sufficient precision. A further reason why the angle α should not be too large is that the support structure 32 would otherwise block too much of the cavity space and reduce the Q factor. Accordingly, the angle α should preferably be at most 60°, more preferably at most 52° and most preferably at most 45°.

FIG. 4*b* and FIG. 5*b* each show a longitudinal sectional view of a slice of the resonator 42 in a longitudinal sectional plane that includes the longitudinal axis 26 and the diameter 34. In this longitudinal sectional plane, each of the support structures 32 has a middle portion 48 in which the width of the support structure 32 assumes its minimum value, a radially inner portion 50, in which the width increases in radially inward direction, and a radially outer portion 52, in which the width increases in radially outward direction. In this longitudinal sectional plane, the "width" is the width in longitudinal direction.

As is seen from the figures, with this geometry, the minimum value of the width of the support structure 32 can be much less than the longitudinal length of the corresponding drift tube 28. This reduced width of the support structure 32 in longitudinal direction allows limiting the space occupied by the support structure, to thereby increase the fraction of the unoccupied cavity and allows for an increased Q factor, as is readily seen in FIG. 4*b* and FIG. 5*b*. The precise dimensions can be somewhat different from what is shown in the figures, but in preferred embodiments, the minimum value of the width of the support structure 32 is less than 50%, preferably less than 40%, more preferably less than 30% and most preferably less than 20% of the longitudinal length of the corresponding drift tube 28.

As is further seen in FIG. 4*b*, at the radially outward ends of the radially outer portions 52 of said support structures 32, where the support structures 32 reach said circumferential wall structure 44 of said tubular structure, the longitudinal width is such that adjacent support structures 32 associated with adjacent drift tubes 28 in the resonator 42 touch each other. The same would apply for the radially outward portions 52 of the embodiment of FIG. 5*b*, but in this figure, only one virtual slice is shown. It is therefore seen that the upper part of the tubular wall structure 44, i.e. the part corresponding to the part that is schematically emphasized with the upper thick line 40 in FIG. 3*a*, is supported by the radially outer portions 52 of the support structures 32 over its entire longitudinal length.

With further reference to FIG. 4*b*, it is seen that a continuous transition is formed between the radially outward ends of the radially outer portions 52 of adjacent support structures 32. In the longitudinal sectional plane depicted in FIG. 4*b*, the transition forms an arcuate transition edge 54. At the apex of the arc formed by said arcuate transition edge 54, or in other words, at the position where the tangent of the transition edge 54 is parallel to the longitudinal axis 26, a comparatively small radius of curvature is formed. This radius of curvature should be chosen small enough to allow for the formation of the desired structure without deformations of the type schematically illustrated in FIG. 3*e*. In preferred embodiments, this radius of curvature is 8 mm or less, but preferably it is even smaller, such as 6 mm or less or even 4 mm or less.

As was pointed out in the summary of the invention above, it is preferred but not necessary that the longitudinal width of the outermost portions of the radially outer portion 52 is large enough such that adjacent outermost portions 52 touch each other. Instead, small longitudinal gaps might be formed in between that are chosen small enough such that the upper portion of the circumferential wall structure 44 of the tubular structure is still sufficiently supported. The longitudinal width of these gaps should be no more than 5 mm, preferably no more than 2.5 mm, to still allow for manufacturing with desired precision.

FIG. 5*a* to FIG. 5*d* show various views of a slice of resonator 42 similar to those of FIGS. 4*a* to 4*d*. With respect to the fundamental features discussed above, both embodiments are in agreement with each other. In particular, in both embodiments, in the longitudinal sectional plane shown in FIG. 4*b* and FIG. 5*b*, the edges 56 of the radially inner portions 50 are concave. This shape has been found particularly useful for obtaining a high Q factor. However, in other embodiments, this edge could also be straight.

In the embodiment of FIG. 4, particularly seen in the longitudinal sectional plane shown in FIG. 4*b*, the edges 58 of the radially outer portions 52 are slightly convex, while in the embodiment of FIG. 5, they are straight along almost the entire length, i.e. up to the region of the continuous transition discussed above. Both variants have been found to give good results.

The most pronounced difference between the embodiment of FIG. 4 and FIG. 5 is that in the embodiment of FIG. 5, in each of the support structures 32, a first duct 60*a* and a second duct 60*b* for carrying a cooling fluid is formed. It is one of the great advantages of the additive manufacturing that these ducts 60*a*, 60*b* can be readily formed in the manufacturing process. In contrast to this, forming these ducts 60*a*, 60*b* in prior art resonators in which individual slices are formed by machining would be much more cumbersome, particularly in case of small diameter RF cavity resonators 42, where the support structures 32 are rather delicate.

In the embodiment shown, the first ducts 60*a* and the second ducts 60*b* of two support structures 32 associated with a same drift tube 28 are connected with each other via a a corresponding first cavity 62*a* and second cavity 62*b*, respectively, both of which being provided in said drift tube 28. The first and second cavities 62*a*, 62*b* are arranged on opposite sides of said bore 30, allowing for highly efficient cooling of the drift tube 28.

Figure 6A:
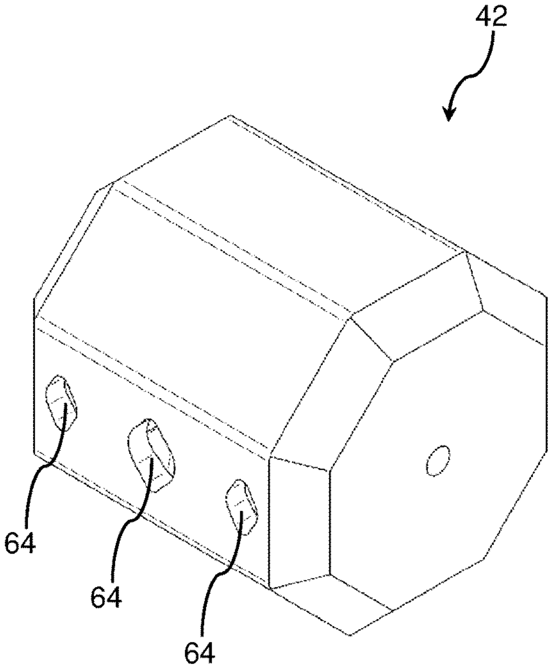
Figure 6B:
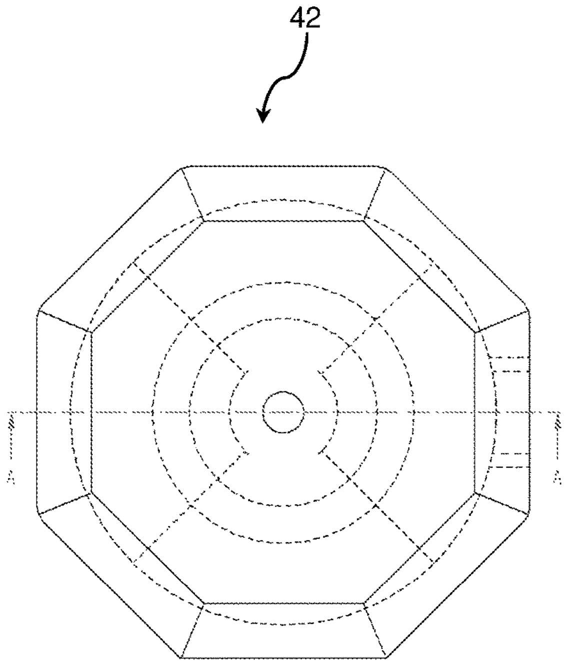
Figure 6C:
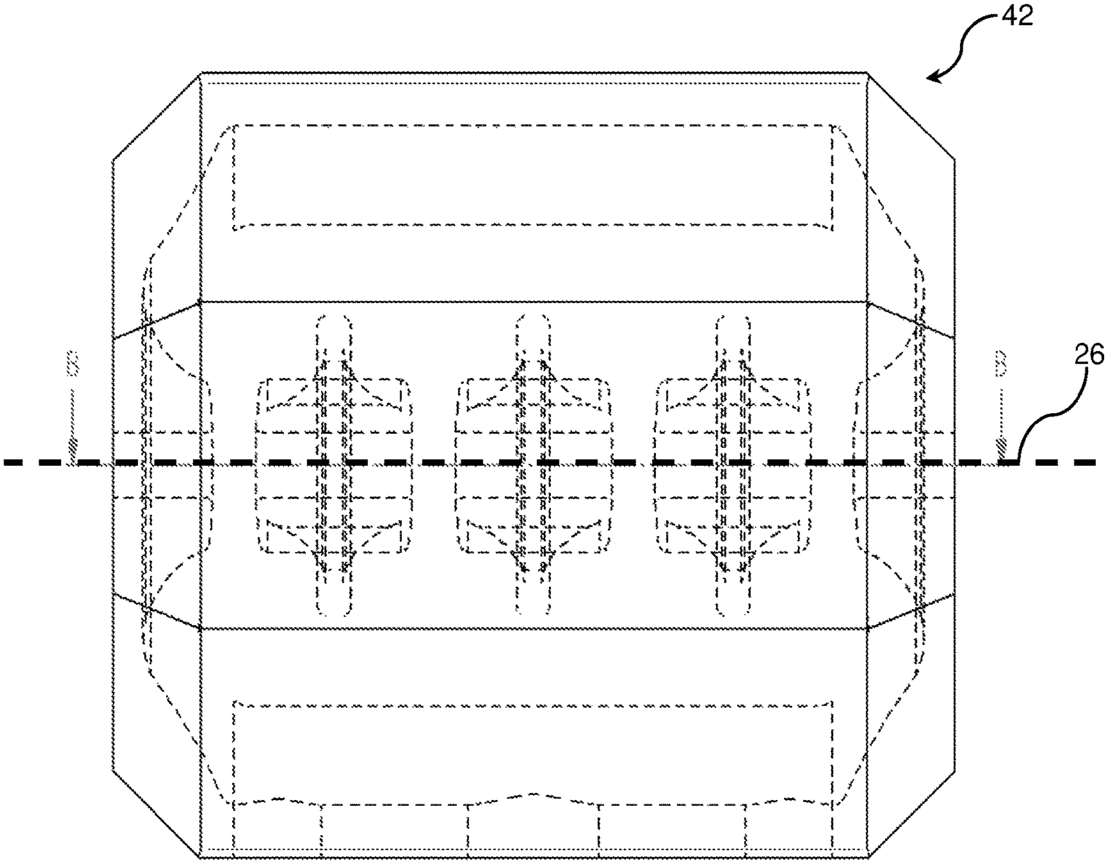
Figure 6D:
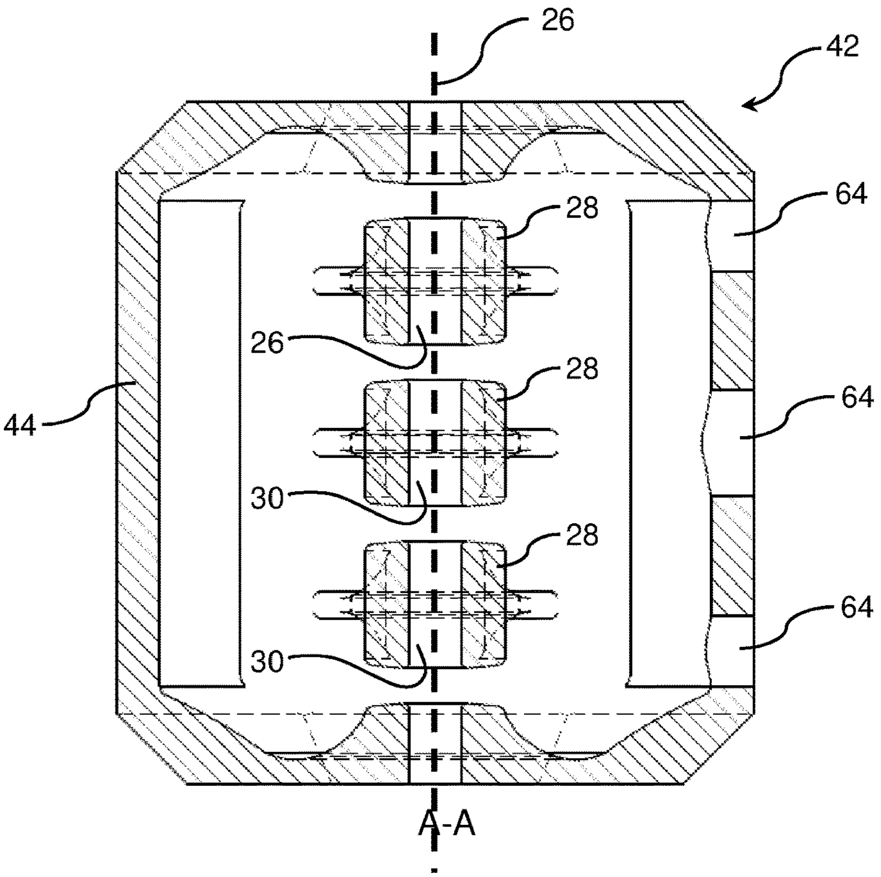
Figure 6E:
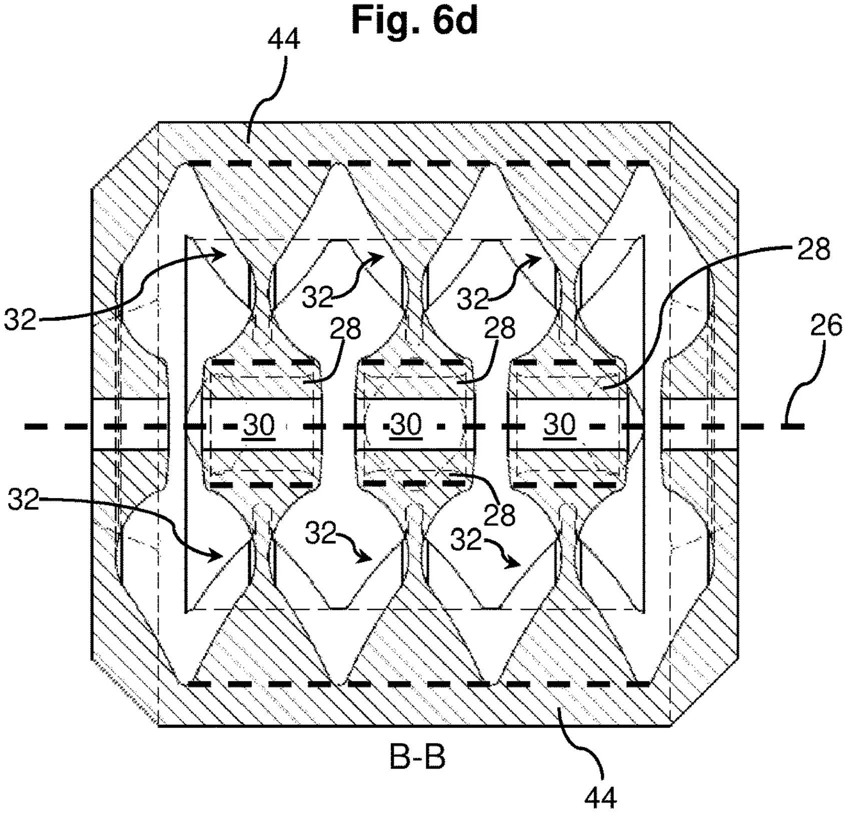

As was indicated above, FIG. 6*a* to FIG. 6*e* show various views of a complete radiofrequency cavity resonator 42 including three drift tubes 28 with corresponding support structures 32 formed according to the virtual slices shown in FIG. 4*a* to FIG. 4*d*. Also shown in FIG. 6*a* are three openings 64 for coupling power into and out of the cavity and frequency tuning purposes, as is known to the skilled person.

The resonator 42 shown in FIG. 6*a-e* has been made as a first prototype in one piece by additive manufacturing, in this case by selective laser sintering using powder of highly pure copper, with a copper content of 99.9% or more, and immediately gave a Q-factor of 6000. This is only moderately reduced over the theoretical value for a simulated structure with perfect surface quality, which provide a Q-factor of about 8000. The somewhat lower Q-factor is attributable to a certain degree of surface roughness due to the additive manufacturing process. The surface roughness can be improved by additional surface treatment, such as conventional surface polishing, but the experience of the inventors shows that this will typically be dispensable. Instead, even the Q-factor obtained in the prototype, where the manufacturing had not been optimized yet, was found to be already sufficient for its intended use as buncher or accelerator structure. Meanwhile, the inventors have found that with the same general geometry, but optimized parameters with regard to distance between drift tubes 28, diameter of the cavity, diameter of the drift tubes 28, specific choice of angles and radii of curvature, the Q-factor can be raised to values similar to those of the conventional manufacturing method.

While the first prototype had only three drift tubes 28, a similar design can be used for a longer RF cavity resonator 42 having a larger number of drift tubes 28, such as 5 to 10 drift tubes 28. In principle, larger structures can likewise be printed in a single piece, as long as the size of the additive manufacturing apparatus allows for this. In the alternative, it is possible to print a number of longitudinal sections of the RF cavity resonator 42 separately and assemble them afterwards, for example by brazing or electron beam welding. These longitudinal sections should be made as large as possible, and preferably include at least two, preferably at least three tubular structures 28 and their corresponding support structures 32 each.

With reference to FIGS. 7*a* to 7*e*, a radio frequency cavity resonator 70 according to an alternative design is shown. Same reference signs are used for similar or like features as shown in the previous figures. The radio frequency cavity resonator 70 comprises a vessel structure extending along a longitudinal axis 26. The vessel structure comprises a circumferential wall structure 72 surrounding said longitudinal axis 26.

Figure 7A:
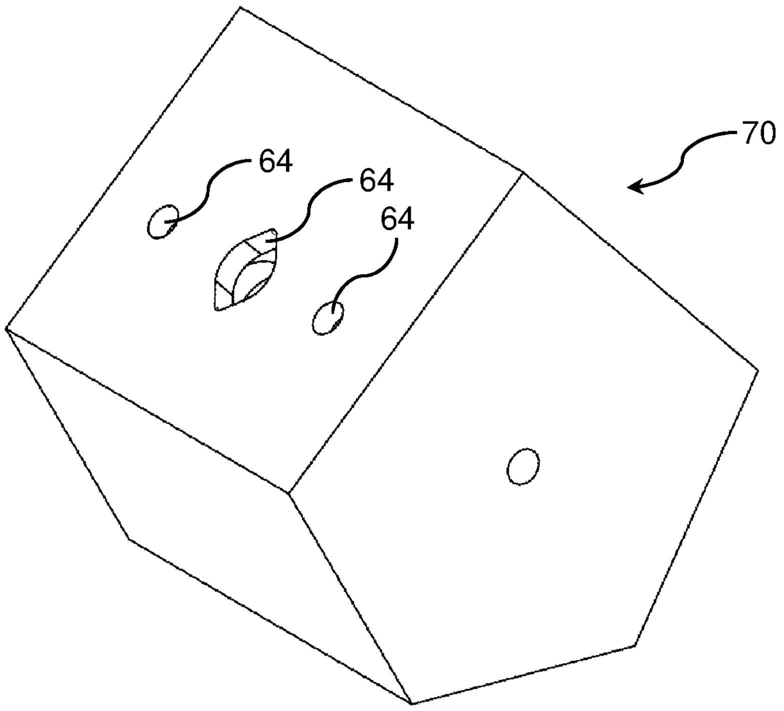
Figure 7B:
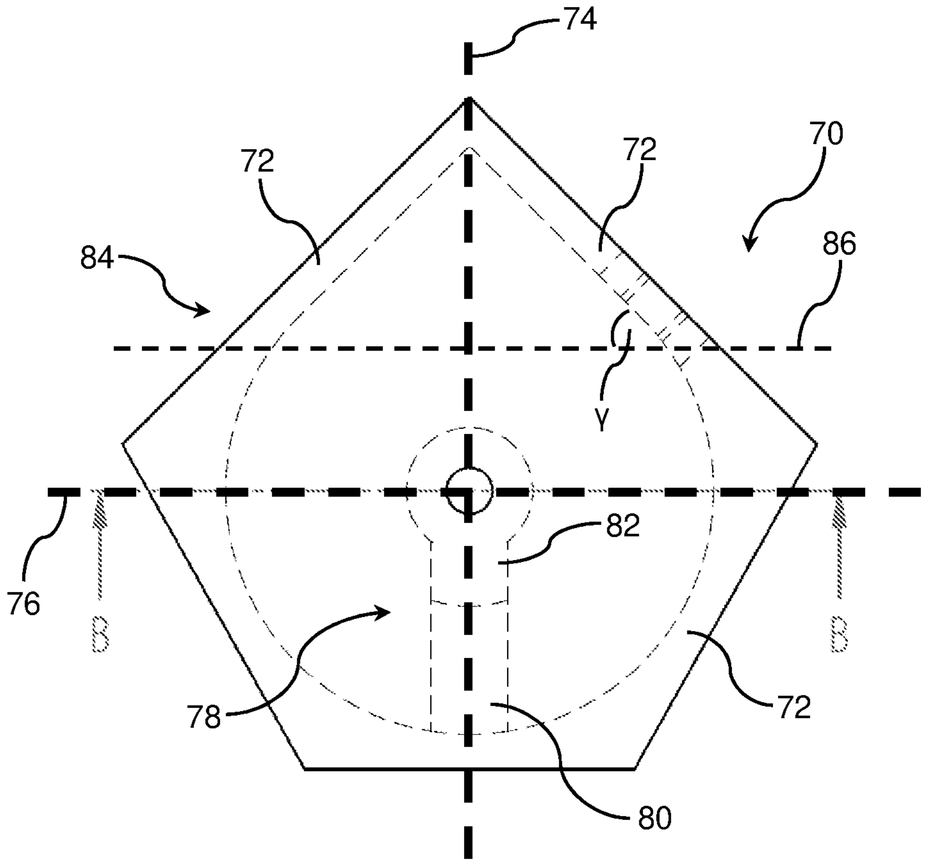

FIG. 7*a* shows a perspective view of the entire resonator 70. FIG. 7*b* is a cross-sectional view of the resonator 70, wherein the cross-sectional paper plane is perpendicular to said longitudinal axis 26. Also shown in FIG. 7*b* are a longitudinal vertical sectional plane 74, which is a plane that is parallel to a vertically upward manufacturing direction and includes the longitudinal axis 26, and a longitudinal horizontal sectional plane 76, which is a plane that is perpendicular to the vertically upward manufacturing direction and includes the longitudinal axis 26.

Figure 7C:
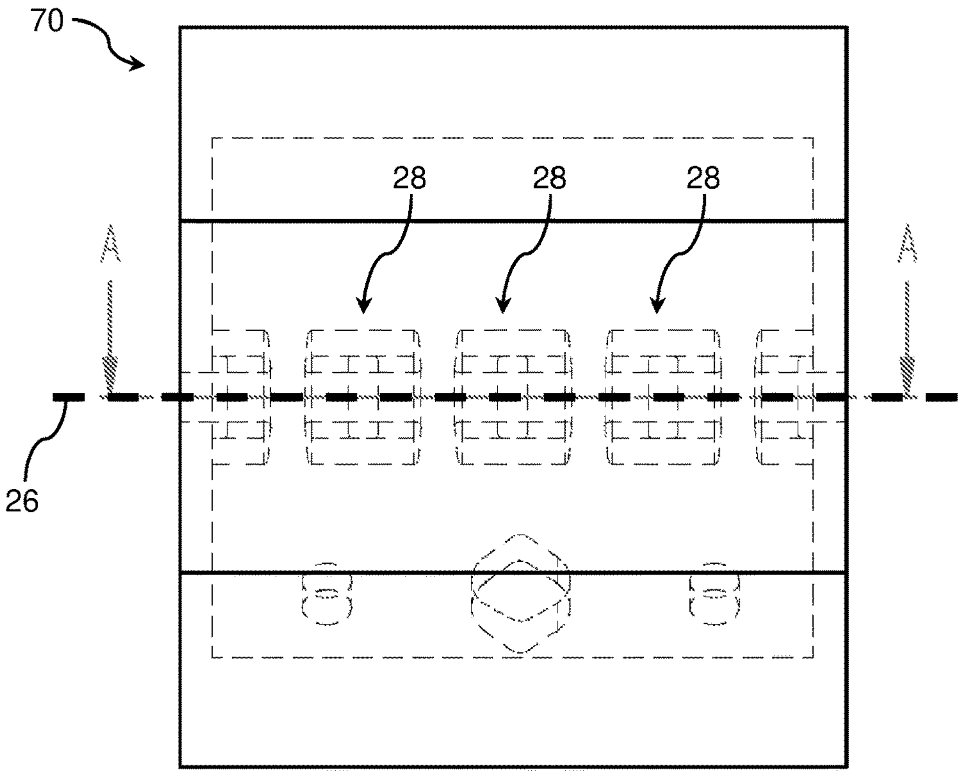

FIG. 7*c* shows a top view onto the resonator 70, in which elements covered by the upper part of the wall structure 70 are shown with hatched lines.

Figure 7D:
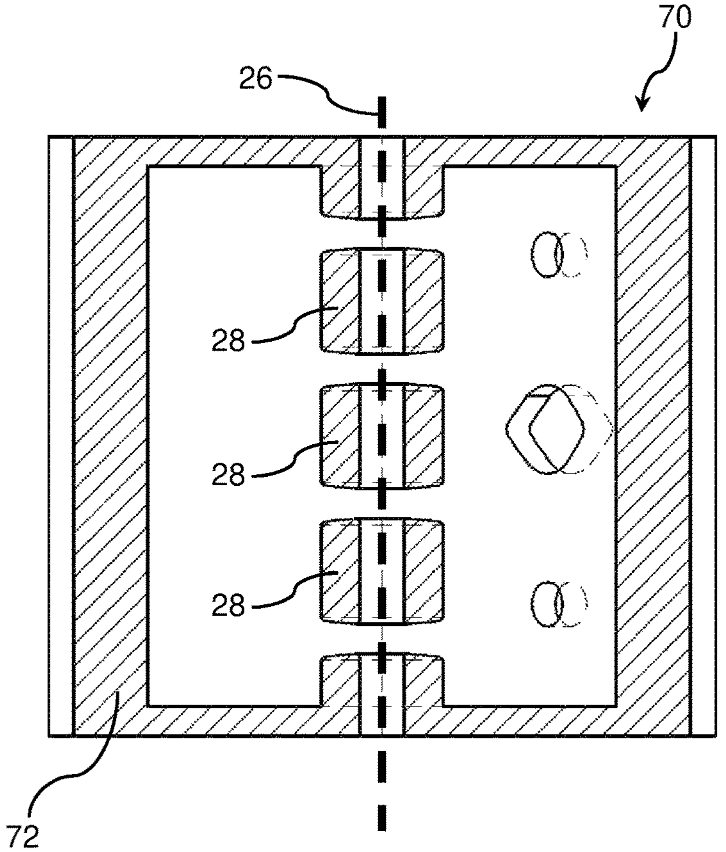
Figure 7E:
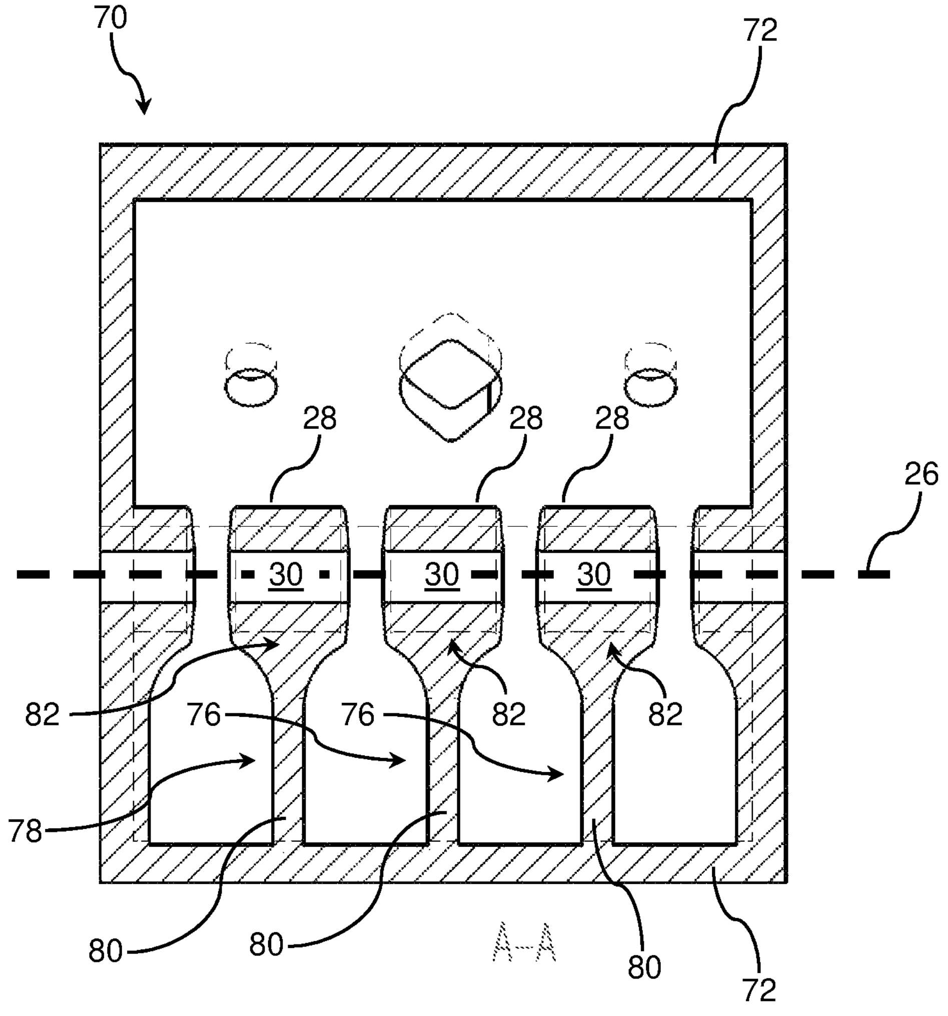

FIG. 7*d* is a longitudinal horizontal sectional view along the arrows B-B in FIG. 7*b*. In other words, the longitudinal horizontal sectional plane 76 of FIG. 7*b* corresponds to the paper plane of FIG. 7*d*. FIG. 7*e* is a longitudinal vertical sectional view along the arrows A-A in FIG. 7*c*, i.e. the longitudinal vertical sectional plane 74 of FIG. 7*b* corresponds to the paper plane of FIG. 7*e*.

As is seen in the Figures, three tubular elements 28, in the particular embodiment drift tubes 28, are arranged within the vessel structure, each having a bore 30 and arranged such that the respective bore 30 is aligned with said longitudinal axis 26. However, different from the previous embodiments, a single support structure 78 is associated with each of said drift tubes 28 only. Each support structure 78 has a first end 80 attached to a portion of said circumferential wall structure 72 and a second end 82 attached to said drift tube 28.

The entire resonator 70 is suitable for producing by additive manufacturing in a vertically upward manufacturing direction, which is the upward direction in FIGS. 7*b* and 7*e*. The vessel structure has a bottom portion with respect to the vertically upward manufacturing direction, at which said first end 80 of said support structure 78 is formed, and an upper portion 84, in which inner surface portions of said wall structure 72 on both sides of a longitudinal vertical sectional plane 74 converge towards each other in vertically upward direction. The upper portion 84 is everything shown above the longitudinal horizontal sectional plane 76 shown in FIG. 7*b*. The converging portions of the wall structure 72 on both sides of the longitudinal vertical section plane 74 form what is referred to herein as a "pitched roof-type structure".

Note that below a further horizontal plane 86 shown in FIG. 7*b*, the inner surface of the wall structure 72 has a cylindrical shape. At the horizontal plane 86, the slope of the inner surface of the wall structure 72 with respect to the horizontal planes 76 or 84 reaches a lower boundary value, which in this embodiment is 45°. This slope is shown as the "overhang angle" γ in FIG. 7*b*. Above the horizontal plane 86, this slope is kept constant, leading to the triangular or pitch roof-type structure. Note that this specific choice of the slope is only exemplary, and that the slope may change in a different manner, as long as it does not fall below a certain threshold value. In the shown preferred embodiment, this threshold value has been chosen to be 45°, but in other embodiments, it may be 38°, or even 30°. This way, it is possible to produce the top portion 84 of the vessel structure 70 by additive manufacturing, without having to provide an additional, second support structure like the upper support structures 32 in the previous figures.

It is seen in FIG. 7*b* that the width of the support structure 78 in the cross-sectional plane (paper plane of FIG. 7*b*) is constant. However, this is not mandatory, and it would e.g. be possible to provide a radially inner portion in which the width increases in radially inward direction and a radially outer portion in which the width increases in radially outward direction, similar as in the previous embodiments.

In FIG. 7*e*, it is seen that at the second end 82 of the support structure 78, a radially inner portion is formed, in which the width in the vertically upward sectional plane increases in radially inward direction. However, similar to the support structures 32 shown in the previous embodiments, it will also be possible to provide for a radially outward portion, in which the width would increase in radially outward direction.

While the present invention has been described in terms of specific embodiments, it is understood that variations and modifications will occur to those in the art, all of which are intended as aspects of the present invention. Accordingly, only such limitations as appear in the claims should be placed on the invention.

What is claimed is:

1. A method of manufacturing a radio frequency cavity resonator, wherein said radio frequency cavity resonator comprises:

a tubular structure extending along a longitudinal axis, said tubular structure comprising a circumferential wall structure surrounding said longitudinal axis;

one or more tubular elements arranged within said tubular structure, each having a bore and arranged such that the respective bore is aligned with said longitudinal axis of said tubular structure; and a first and a second support structure associated with each of said tubular elements, wherein said first and second support structures are provided on opposite sides of each tubular element and include one or more edges which extend radially along a diameter of the tubular structure between the tubular element and a corresponding one of two opposite wall structure portions of said tubular structure, wherein:

the method comprises producing the entire resonator, or at least longitudinal sections thereof that are subsequently assembled to form the resonator, by additive manufacturing in a manufacturing direction that is parallel to said diameter, wherein said first support structure is produced first and said second support structure is produced thereafter;

said additive manufacturing comprises forming said support structures such that:

in a cross-sectional plane that is perpendicular to the longitudinal axis and includes the diameter, the width of at least said second support structure increases in radially outward direction, wherein in this cross-sectional plane, said width is the width in a direction perpendicular to the diameter of the tubular structure and such that in said cross-sectional plane, the edges of said second support structure have an average angle α with respect to the diameter that is at least 25°; and in a longitudinal sectional plane that includes the longitudinal axis and the diameter, at least said second support structure is formed to have a radially outer portion, in which the width increases in radially outward direction, wherein in this longitudinal sectional plane, said width is the width in longitudinal direction.

2. The method of claim 1, wherein in said longitudinal sectional plane that includes the longitudinal axis and the diameter, at least one of said support structures has a middle portion in which the width of said support structure assumes its minimum value, wherein in this longitudinal sectional plane, said width is the width in longitudinal direction.

3. The method of claim 1, wherein in said longitudinal sectional plane that includes the longitudinal axis and the diameter, at least said first support structure has a radially inner portion, in which the width increases in radially inward direction, wherein in this longitudinal sectional plane, said width is the width in longitudinal direction.

4. The method of claim 1, wherein at the radially outward end of the radially outer portion of at least said second support structure, where the second support structure reaches said circumferential wall of said tubular structure, the longitudinal width is such that an adjacent support structure associated with an adjacent tubular element in the finished resonator touch each other or are less than 5 mm apart from each other.

5. The method of claim 1, wherein a continuous transition is formed between the radially outward ends of the radially outer portions of at least adjacent second support structures, wherein in said longitudinal sectional plane, the transition forms a transition edge, and wherein the radius of curvature of said transition edge at the position where the tangent is parallel to the longitudinal axis is 8 mm or less.

6. The method of claim 1, wherein in said cross-sectional plane, the edges of at least said second support structure have an average angle α with respect to the diameter that is at most 60°.

7. The method of claim 1, wherein in said cross-sectional plane, the edges of one or both of said first and second support structures are straight along at least 70% of their length.

8. The method of claim 1, wherein in said longitudinal sectional plane the minimum value of the width of one or both of said first and second support structures is less than 40% of the longitudinal length of the corresponding tubular element.

9. The method of claim 3, wherein the radial length of said radially outer portion of one or both of said first and second support structures is longer than the radial length of their respective radially inner portion.

10. The method of claim 3, wherein in said longitudinal sectional plane, the edges of the radially inner portions of one or both of said first and second support structures are straight or concave.

11. The method of claim 1, wherein in said longitudinal sectional plane, the edges of the radially outer portions of one or both of said first and second support structures are straight or convex.

12. The method of claim 1, wherein a duct for carrying cooling fluid is formed in said support structures.

13. The method of claim 12, wherein the ducts of two support structures associated with a same tubular element are connected with each other, and wherein each of said support structures comprises a first duct and a second duct, wherein the first ducts and the second ducts of the support structures are connected with each other via a first cavity and a second cavity provided in said tubular element, respectively, wherein said first and second cavities are arranged on opposite sides of said bore.

14. The method of claim 1, wherein said resonator is made from high purity copper having a copper content of 99.9% or more.

15. The method of claim 1, wherein said resonator has between 3 and 10 tubular elements.

16. The method of claim 1, wherein said resonator is a resonator for or in a drift-tube linear accelerator (DTL), a side coupled DTL, a coupled cavity DTL, a coupled cavity linear accelerator or a buncher.

17. The method of claim 1, wherein said additive manufacturing is based on one of electron beam melting, selective laser sintering, and selective laser melting.

* * * * *